US011423357B2

(12) United States Patent
Didrickson et al.

(10) Patent No.: US 11,423,357 B2
(45) Date of Patent: Aug. 23, 2022

(54) REUSABLE COMPONENTS FOR COLLABORATIVE CONTENT ITEMS

(71) Applicant: Dropbox, Inc., San Francisco, CA (US)

(72) Inventors: Kristof Didrickson, San Francisco, CA (US); Jeffrey Gochman, San Francisco, CA (US); Jasvir Nagra, Redwood City, CA (US); Maryana Bezler, San Mateo, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 16/944,075

(22) Filed: Jul. 30, 2020

(65) Prior Publication Data

US 2022/0036311 A1 Feb. 3, 2022

(51) Int. Cl.
*G06F 40/197* (2020.01)
*G06F 40/166* (2020.01)
*G06F 16/93* (2019.01)
*G06F 40/131* (2020.01)
*G06F 40/103* (2020.01)
*G06Q 10/10* (2012.01)
*G06F 40/134* (2020.01)

(52) U.S. Cl.
CPC ............ *G06Q 10/10* (2013.01); *G06F 16/93* (2019.01); *G06F 40/103* (2020.01); *G06F 40/131* (2020.01); *G06F 40/134* (2020.01); *G06F 40/166* (2020.01); *G06F 40/197* (2020.01); *G06Q 10/101* (2013.01)

(58) Field of Classification Search
CPC ...... G06F 40/134; G06F 40/131; G06F 16/93; G06F 40/103; G06F 40/166; G06F 40/197; G06Q 10/101
See application file for complete search history.

(56) References Cited

U.S. PATENT DOCUMENTS

| | | | |
|---|---|---|---|
| 7,783,614 B2 * | 8/2010 | Jones | G06F 40/151 707/694 |
| 8,037,038 B2 | 10/2011 | Cragun et al. | |
| 8,290,958 B2 | 10/2012 | Boone et al. | |
| 8,434,134 B2 * | 4/2013 | Khosrowshahi | G06F 40/134 726/7 |
| 8,490,052 B2 * | 7/2013 | Shukla | H04L 67/02 717/117 |
| 8,495,658 B2 | 7/2013 | Zakon et al. | |
| 8,712,947 B2 | 4/2014 | Shanmukh et al. | |

(Continued)

*Primary Examiner* — Benjamin Smith
(74) *Attorney, Agent, or Firm* — Fenwick & West LLP

(57) ABSTRACT

Computer-implemented techniques are disclosed for managing reusable collaborative content item components in a collaborative content management system. The techniques include providing locations in collaborative content items where users may store reusable components. When editing a collaborative content item, a user may select a portion, fragment or section of the collaborative content item content and save that as a reusable component. The reusable component is saved in a reusable component catalog. Other users may then insert the same component from the reusable component catalog t into their collaborative content items. When the component in the catalog is updated, other collaborative content items in the collaborative content management system that use that component are automatically updated as well.

18 Claims, 14 Drawing Sheets

(56) References Cited

U.S. PATENT DOCUMENTS

| | | | |
|---|---|---|---|
| 8,712,953 B2* | 4/2014 | Beringer | G06F 16/289 |
| | | | 707/600 |
| 9,286,271 B2* | 3/2016 | Khosrowshahi | G06F 40/166 |
| 9,424,333 B1* | 8/2016 | Bisignani | G06F 16/248 |
| 9,614,933 B2* | 4/2017 | Jwalanna | G06Q 10/107 |
| 10,466,867 B2* | 11/2019 | Boucher | G06F 16/2228 |
| 10,466,868 B2* | 11/2019 | Boucher | G06F 16/2228 |
| 10,565,298 B1* | 2/2020 | Bisignani | G06F 40/134 |
| 11,115,486 B2* | 9/2021 | Jimenez Salgado | G06F 9/543 |
| 2002/0165883 A1 | 11/2002 | Sans et al. | |
| 2004/0030726 A1 | 2/2004 | Baxter et al. | |
| 2004/0162833 A1* | 8/2004 | Jones | G06F 16/86 |
| 2010/0095272 A1* | 4/2010 | Shukla | G06F 9/45512 |
| | | | 717/117 |
| 2010/0251129 A1* | 9/2010 | Beringer | G06F 9/451 |
| | | | 707/E17.014 |
| 2011/0296507 A1* | 12/2011 | Khosrowshahi | G06F 40/166 |
| | | | 726/7 |
| 2013/0219268 A1* | 8/2013 | Straten | G06F 40/166 |
| | | | 715/256 |
| 2013/0246346 A1* | 9/2013 | Khosrowshahi | G06F 21/10 |
| | | | 707/608 |
| 2014/0365555 A1* | 12/2014 | Jwalanna | G06F 16/176 |
| | | | 709/203 |
| 2017/0200122 A1* | 7/2017 | Edson | H04L 63/104 |
| 2017/0315683 A1* | 11/2017 | Boucher | G06F 3/04847 |
| 2017/0315979 A1* | 11/2017 | Boucher | G06F 3/0486 |
| 2019/0065615 A1* | 2/2019 | Room | G06F 3/0482 |
| 2020/0042606 A1* | 2/2020 | Ben-Ishay | G06F 9/541 |
| 2020/0053176 A1* | 2/2020 | Jimenez Salgado | G06F 9/543 |
| 2020/0265040 A1* | 8/2020 | Jung | G06F 16/2457 |

* cited by examiner

REUSABLE COMPONENTS FOR COLLABORATIVE CONTENT ITEMS

TECHNICAL FIELD

This disclosure relates generally to computer-implemented techniques for reusable components in collaborative content items.

BACKGROUND

Networked collaborative content management systems can be an integral part of an organization's productivity. Such systems are used to store, manage, and collaborate on content items in a networked computing environment. For example, some systems implement operational transformation technology or the like to allow users to edit and collaborate on content items (e.g., online documents) together with other users over the Internet.

With such systems, changes (e.g. edits) to collaborative content items can occur frequently. The rapid changes can make it difficult if not impractical for all collaborative content item revisions to flow through an editor or a team of editors, which may be geographically distributed. Complexity, speed and geographic distances have created a need for more automated ways to effectively manage collaborative content items. Embodiments disclosed herein address this and other issues.

Collaborative content management systems allow users to create and manage their collaborative content items. Such systems enable organizations to save time and money and improve productivity. Some systems also provide the scalability, flexibility and interoperability that meet organizational needs. However, collaborative content management system solutions are still being developed, with issues that still need to be addressed.

For example, in many systems, there are often common pieces of collaborative content item content which are usable in many collaborative content items. However, managing these common pieces is still difficult with current systems. Embodiments disclosed herein address this and other issues.

The approaches described in this section are approaches that could be pursued, but not necessarily approaches that have been previously conceived or pursued. Therefore, unless otherwise indicated, it should not be assumed that any of the approaches described in this section qualify as prior art, or are well-understood, routine, or conventional, merely by virtue of their inclusion in this section.

DETAILED DESCRIPTION

In the following description, for the purposes of explanation, numerous specific details are set forth in order to provide a thorough understanding of various computer-implemented embodiments of reusable components for collaborative content items. It will be apparent, however, that the embodiments may be practiced without these specific details. In other instances, structures and devices are shown in block diagram form in order to avoid unnecessarily obscuring the embodiments.

Overview

Computer-implemented embodiments are disclosed for managing reusable collaborative content item components in a networked collaborative content management system (or just "collaborative CMS" for short). Some embodiments include providing locations in collaborative content items where users may store reusable content. When editing a collaborative content item, a user may select a portion, fragment or section of the collaborative content item content and save that as a reusable component. The reusable component is saved in a reusable component catalog. Other users may then insert the same component into their collaborative content items. When the component in the catalog is updated, all collaborative content items in the collaborative CMS that use that component are automatically updated as well.

According to some embodiments, component creation and editing may be performed by a user directly in the user's regular collaborative content item editing environment. The user is not required to use another application to define the component before including the component in a collaborative content item being edited.

According to some embodiments, component creation and editing may be performed from the catalog. For example, the catalog may present to the user a list of accessible components and user interface controls for sorting and filtering the list. The catalog also supports organizing and categorizing related components.

According to some embodiments, a reference to a component may be inserted into a collaborative content item rather than the component itself. When the collaborative content item is opened for editing (which encompasses viewing), the reference is automatically resolved, and a current version of the component is inserted into the collaborative content item.

According to some embodiments, a user can select a component and then view a list of collaborative content items in the collaborative CMS which are currently using that component. The system also provides access control for components so that only authorized users can insert protected components into the collaborative content items they are authorized to access. Additionally, the system prevents a component that is currently being used in a collaborative content item from being deleted.

Example System Environment

Figure 1:
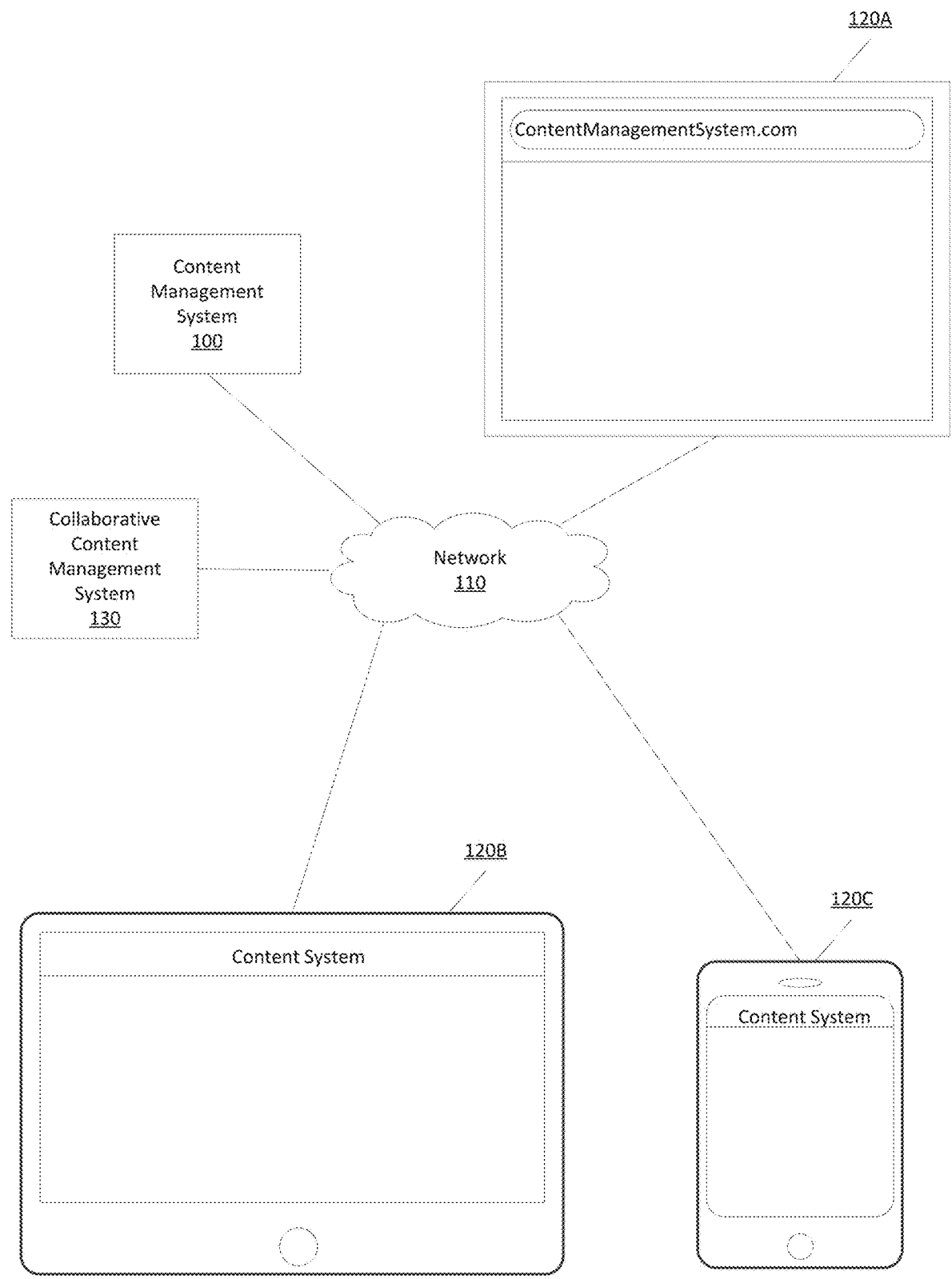
FIG. 1 depicts an example content management system environment.

FIG. 1 shows a system environment including content management system 100, collaborative content management system 130 and client devices 120a, 120b and 120c (collectively or individually "120"), according to some embodiments. Content management system 100 provides functionality for sharing content items with one or more client devices 120 and synchronizing content items between content management system 100 and one or more client devices 120.

The content stored by content management system 100 can include any type of content items, such as documents, spreadsheets, collaborative content items, text files, audio files, image files, video files, webpages, executable files, binary files, placeholder files that reference other content items, etc.

In some embodiments, a content item can be a portion of another content item, such as an image that is included in a content item. Content items can also include collections, such as folders, namespaces, playlists, albums, etc., that group other content items together. The content stored by content management system 100 may be organized in one configuration in folders, tables, or in other database structures (e.g., object oriented, key/value etc.).

In some embodiments, the content stored by content management system 100 includes content items created by using third party applications, e.g., word processors, video and image editors, database management systems, spreadsheet applications, code editors, and so forth, which are independent of content management system 100.

In some embodiments, content stored by content management system 100 includes content items, e.g., collaborative content items, created using a collaborative interface provided by collaborative content management system 130. In various implementations, collaborative content items can be stored by collaborative content item management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In some example embodiments, network 110 is the Internet and uses standard communications technologies or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc.

In some embodiments, the entities use custom or dedicated data communications technologies instead of, or in addition to, the ones described above.

While in some embodiments, content management system 100 and collaborative content management system 130 are two distinct systems operated by the same or different application service providers, content management system 100 and collaborative content management system 130 are combined together or integrated with each other to form an overall combined or integrated system. In either case, a system or systems may include one or more server computing devices configured to provide the functionality discussed herein for the systems 100 or 130.

Example Client Device

Figure 2:
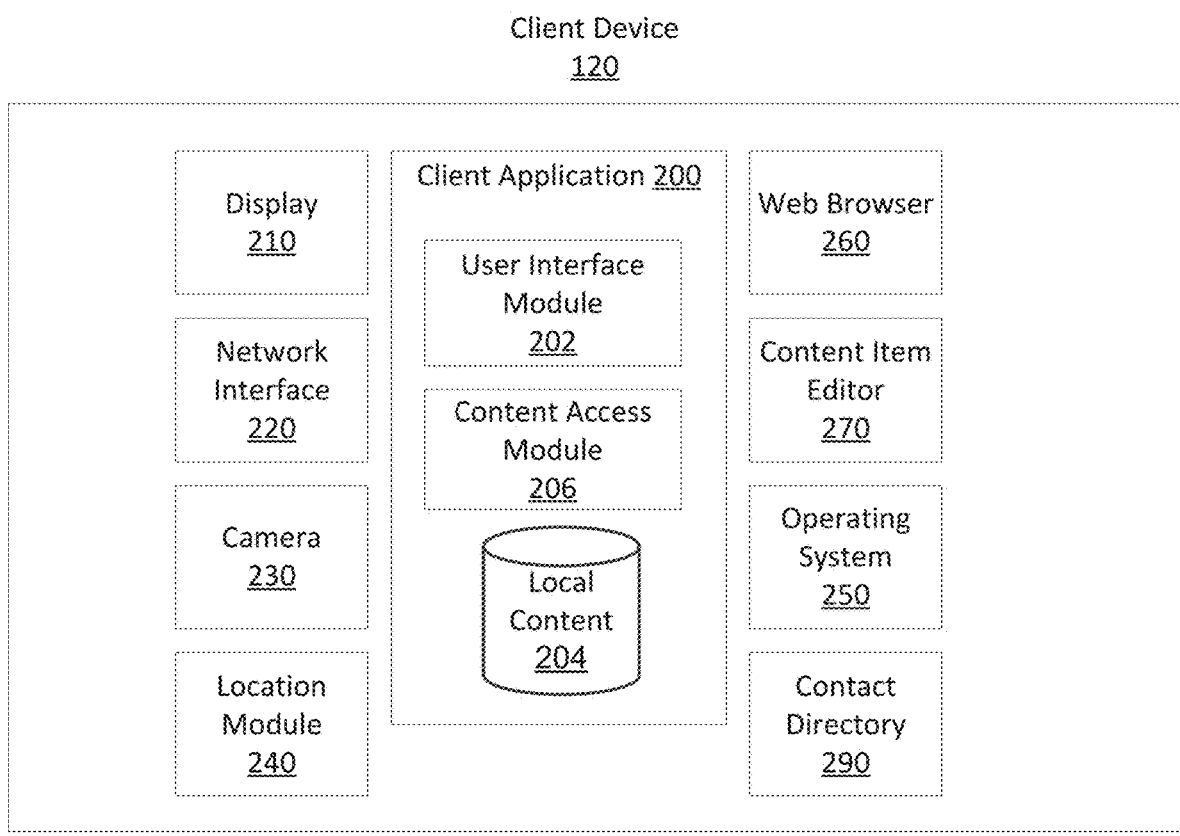
FIG. 2 depicts components of an example client device.

FIG. 2 shows a block diagram of the components of a client device 120 according to some embodiments. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In some embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in nonvolatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plugin, or a browser extension.

Example Content Management System

Figure 3:
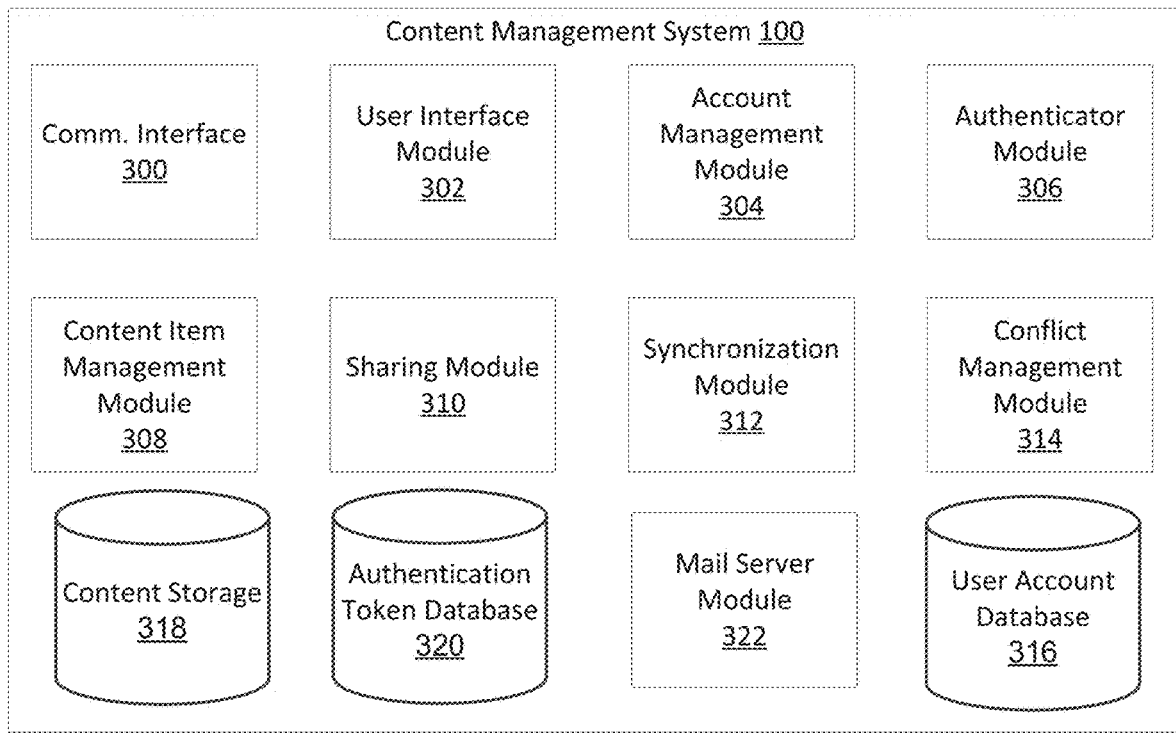
FIG. 3 depicts an example content management system.

FIG. 3 shows a block diagram of the content management system 100 according to some embodiments. To facilitate the various content management services, a user can create an account with content management system 100. The account information can be maintained in user account database 316, and is one means for performing this function. User account database 316 can store profile information for registered users. In some cases, the only personal information in the user profile is a username or email address. However, content management system 100 can also be configured to accept additional user information, such as password recovery information, demographics information, payment information, and other details. Each user is associated with a userID and a username. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on a type or category associated with the user (e.g., elevated permissions for administrator users or manager), the user's inclusion in a group or being identified as part of an organization (e.g., specified permissions for all members of a particular team), or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some embodiments, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user.

Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid or delete the matching authentication token from authentication token database 320.

In some embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some example embodiments, multiple user account identifiers can be associated with a single content entry indicating that the content item has shared access by the multiple user accounts.

In some embodiments, the content management system 100 can include a mail server module 322. The mail server module 322 can send (and receive) collaborative content items to (and from) other client devices using the collaborative content management system 100. The mail server module can also be used to send and receive messages between users in the content management system.

Example Collaborative Content Management System

Figure 4:
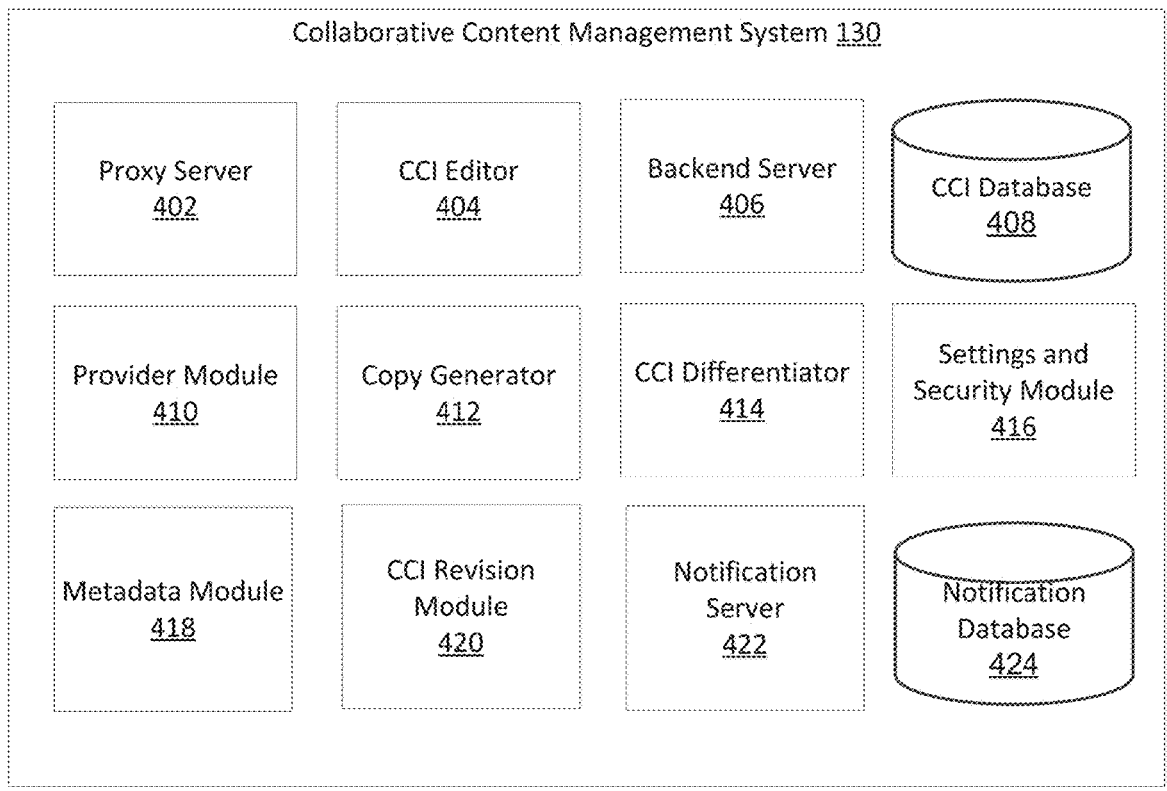
FIG. 4 depicts an example collaborative content management system.

FIG. 4 shows a block diagram of the collaborative content management system 130, according to example embodiments. Collaborative content items can be files that users can create and edit using a collaborative content items editor 270 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In some embodiments, collaborative content management system 130 is separate from content management system 100 and can communicate with it to obtain its services. In some embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and collaborative content item database 408, access link module 410, copy generator 412, collaborative content item differentiator 414, settings module 416, metadata module 418, revision module 420, notification server 422, and notification database 424. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items proxy server 402 to client application 200, so the client application can directly collaborative content item editor 404 for future requests. In alternative example embodiments, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access module 410 receives a request to provide a collaborative content item to a client device. In some example embodiments, the access module generates an access link to the collaborative content item, for instance in response to a request to share the collaborative content item by an author. The access link can be a hyperlink including or associated with the identification information of the CCI (e.g., unique identifier, content pointer, etc.). The hyperlink can also include any type of relevant metadata within the content management system (e.g., author, recipient, time created, etc.). In some example embodiments, the access module can also provide the access link to user accounts via the network 110, while in other example embodiments the access link can be provided or made accessible to a user account and is accessed through a user account via the client device. In some embodiments, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of the collaborative content management system to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (e.g., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received, and the user account associated with the client device requesting the copy. When the copy of the collaborative content item is generated it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In some embodiments, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, e.g. a differential collaborative content item. In some embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The settings and security module 416 can manage security during interactions between client devices 120, the content management system 100, and the collaborative content management system 130. Additionally, the settings and security module 416 can manage security during interactions between modules of the collaborative content management system.

For example, when a client device 120 attempts to interact within any module of the collaborative content management system 100, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include requiring authentication of client devices 120 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 100, collaborative content management system 130, client devices 120, or collaborative content items.

The metadata module 418 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point the metadata module can manage metadata by changing, adding, or removing metadata.

Some examples of internal metadata can be identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differential collaborative content items and selectively interacts with backend servers 406 for processing lower level processing tasks on collaborative content items and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system.

Finally, the functions and operations of content management system 100 and collaborative content management system 130 are sufficiently complex as to require implementation on a computer system and cannot be performed in the human mind simply by mental steps.

Example Editing View

Figure 5:
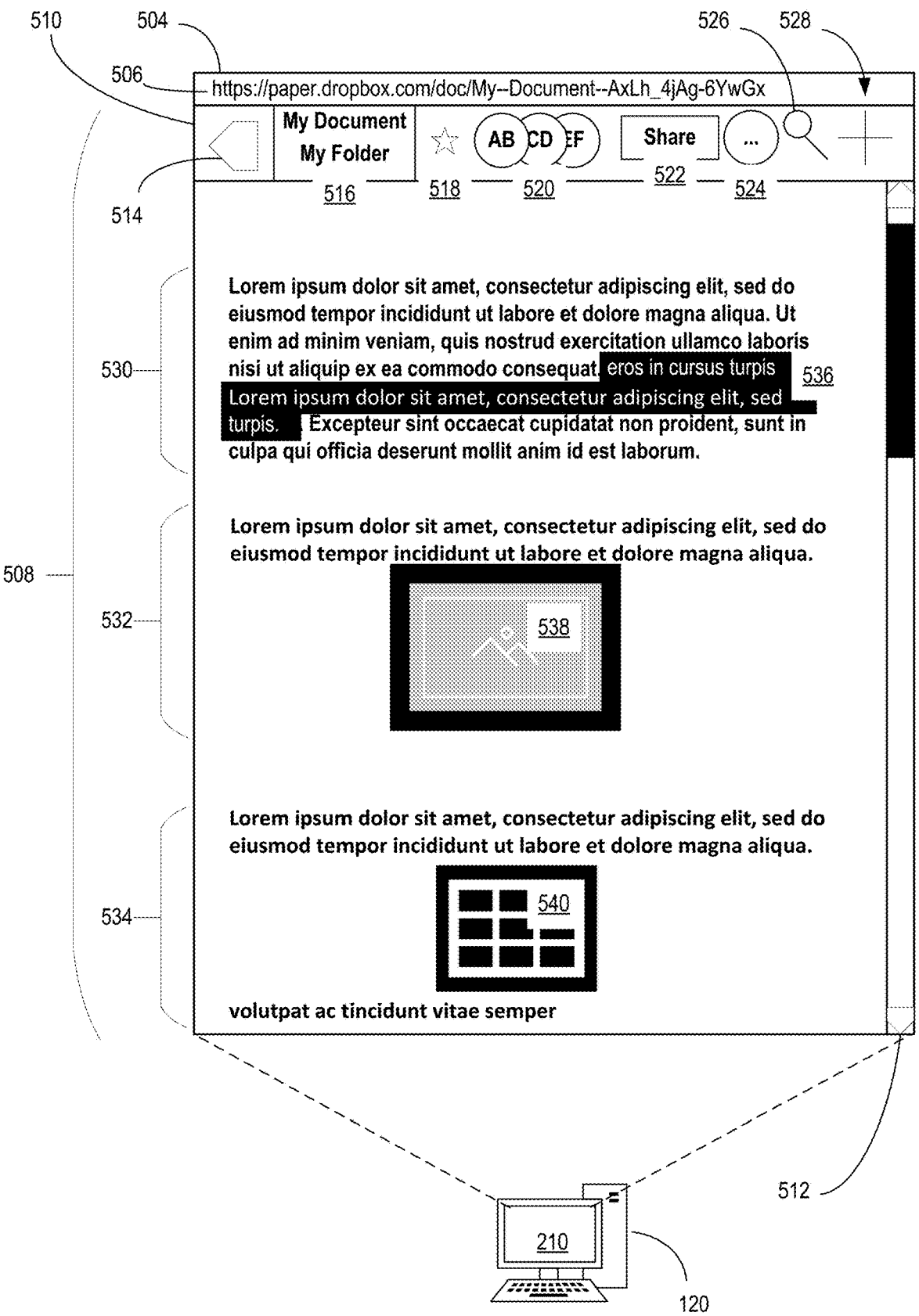
FIG. 5 is an example editing view of a collaborative content item.

FIG. 5 is an editing view provided by a client device 120, according to some embodiments. The editing view is of a collaborative content item having reusable components 536, 538, and 540.

Client device 120 displays information on display 210. Display screen 210 is enlarged to depict details of the display. Display 210 relates to a simplified display of a web browser application with the capability of viewing and editing collaborative content items. Such content items may include, but are not limited to, word processing documents, spreadsheet documents, and slide show presentation documents.

While display 210 displays a web browser application, other types of software applications may be used to view and edit collaborative content items such as, for example, mobile applications and dedicated client applications (e.g., collaborative content item editor 270). Thus, a web browser application is used as an example and not meant as a limitation.

In this example, display 210 has a web browser window 504. Web browser window 504 has a navigation field 506. Navigation field 506 indicates the Uniform Resource Locator (URL) of the current collaborative content item being viewed/edited and allows a user of web browser window 504 to enter other URLs to navigate to other collaborative content items or web pages.

Since the current view of the collaborative content item is an editing view, within browser window 504, there is a sub-window referred to as content editing window 508. In this example, editing window 508 displays a set of content sections (530, 532, 534) that are included in the collaborative content item. The content sections, and the content within the sections may be edited within editing window 508. More content sections may be available to include in the collaborative content item as represented by scroll bar 512. A content sections of a collaborative content item may include, but is not limited to, a grammatical unit (e.g., a word, sentence, or paragraph) of the collaborative content item or other continuous portion, segment, page, section or fragment of the collaborative content item.

As indicated, browser window 504 includes editing window 508 for editing content of the collaborative content item. Although the content being edited in this example include primarily text content (e.g., one or more sequences of text characters), editing window 508 is not limited for use in editing only text content. Editing window 508 may be used for editing other types of content in addition to text content such as image content, graphics content, video content, or audio content. Further, editing window 508 is not limited to adding content to, removing content from, or changing the content of the content. Editing may also include configuring the layout, orientation, and format of the content, for example.

Editing window 508 provides a toolbar 510 at the top of the window 508. The toolbar includes an interactive back button 514 for returning to a prior user interface state. The toolbar also includes title and folder information 516 pertaining to the collaborative content item being edited. In this example, the title of the content item is "My Document" and the content item is contained in a folder named "My Folder". The toolbar also includes an interactive "favorites" icon 518 which, if selected, tags, marks, or otherwise designates the collaborative content item as one of the editing user's favorites. The icon 518 may be displayed differently (e.g., in a different color) depending on whether the content item is currently designated as one of the editing user's favorites. The toolbar also includes following avatars 520 which indicate users that have accessed the content item, including the current user(s) editing the content item. In this example, an avatar of a user includes the user's initials. However, the avatar could represent a user otherwise (e.g., with a thumbnail photo of the user or other icon representing the user). The toolbar also includes an interactive share button 522 that allows the editing user to share the collaborative content item with one or more other users that the editing user selects. The toolbar also includes an interactive "options" button 524 that, if activated, provides a drop-down menu of various editor functions that the editing user can select from the drop-down menu. Such selectable editor functions may include displaying a view history, displaying a current word count, printing the content item, downloading the content item, moving the content item to a different folder, archiving the content item, etc. The toolbar also includes an interactive search icon 526 that allows the editing user to search within the collaborative content item or search for other collaborative content items that the editing user has access to. The toolbar also includes an interactive new collaborative content item icon 528 for creating a new collaborative content item. The toolbar provided in editing window 508 is merely exemplary and editing window 508 may provide a toolbar displaying different information or providing a different set of options to the editing user.

A user may interact with editing window 508 of the content item editing application to edit the collaborative content item. The collaborative content item may belong to a general collaborative content item type category such as, for example, text (e.g., a textual message, plain unformatted text, enriched text, word processing text, rich text, etc.), multipart (e.g., data consisting of multiple parts of independent data types including text and other media such as images, video, sound, etc.), message (e.g., an encapsulated message, an RFC 822 conformant message, etc.), or application (e.g., some other kind of data, binary data in a standardized, proprietary, or application-specific format, etc.).

Within a general collaborative content item type category, the collaborative content item may have a specific collaborative content item type. In some implementations, the collaborative content item comprises at least one "attributed" text string representing the content of the collaborative content item and an associated set of attributes. Each attribute may be associated with a character or a range of one or more characters in the attributed text string to which the attribute applies or describes. The association between an attribute and a character or a range of one or more characters may be established by a numerical index or numerical indices into the attributed text string that identify the character or range of characters with which the attribute is associated. An attribute may be a key/value pair, identified by the key, where no two attributes that apply to a given character of the attributed text string have the same key. Attributes associated with the attributed text string may be processed in an application-specific manner. For example, the range of characters in the attributed text string representing the text content of the collaborative content item may be associated with an attribute that indicates that the characters are to be formatted by the content item editing application in a 12-point typeface.

When stored in a computer (e.g., on disk or in memory), the collaborative content item may be stored in a variety of different manners. In one way, the collaborative content item may be stored as a sequence of change sets. In this context, a change set represents an edit to a particular version of the collaborative content item. When applied to a version of the collaborative content item, a change set can insert and delete characters and apply attributes to ranges of characters. For example, a particular change set might represent the edit insert the lowercase character "d" at position 2 in the text string. If the particular change set is applied to a version of the collaborative content item having the text string "abc\n", then the resulting collaborative content item version would have the text string "adbc\n". The collaborative content item comprising the attributed text string and the set of associated attributes may thus be formed by applying a sequence of change sets to an initial version of the collaborative content item. The initial collaborative content item version may be a collaborative content item template or a prior version of the collaborative content item, for example.

The collaborative content item may be stored in various different types of data containers. For example, the collaborative content item may be stored in a file system file container, in a database, in one or more data blocks in a distributed file system, or as a base version and a series of any number of changes to the base version. The collaborative content item may be stored by a single computing device or portions of the collaborative content item may be stored by different computing devices in a distributed file system.

The collaborative content item may be configured for unidirectional or bidirectional synchronization. In the unidirectional case, changes to the collaborative content item originating at a user's client device are replicated to one or more other client devices where the replicated changes are applied to copies of the collaborative content item stored at those other client devices. In the case of bidirectional synchronization, changes to the collaborative content item originating at a user's client device are replicated to one or more other client devices where the replicated changes are applied to copies of the collaborative content item stored at those other client devices as in the case of unidirectional synchronization. In addition, with bidirectional synchronization, changes to the collaborative content item originating at the other client devices are replicated to the user's client device where the replicated changes are applied to a copy of the collaborative content item stored at the user's client device.

When collaborative content item changes are replicated between client devices, the changes may be replicated through an intermediary server system operated by an online service provider that stores and forwards the changes. However, it is also possible to replicate collaborative content item changes between client devices in a peer-to-peer fashion. In a peer-to-peer scenario, the intermediary server system may still provide metadata to client devices for facilitating peer-to-peer replication of collaborative content item changes even though the collaborative content item changes themselves are not stored and forwarded by the intermediary server system. Further, because changes can be (asynchronously) replicated, there may be a period of time where copies of the collaborative content item at different client devices are not identical.

Within content sections 530, 532, 534 are selected reusable components 536, 538, 540. A reusable component may correspond to a portion of text (e.g., reusable text component 536) or otherwise correspond to other types of collaborative content item content such as images (e.g., reusable image component 538) and data tables (e.g., reusable data table component 540). While the content of the content sections can be logically separated into components, only the text, images, data tables, or other collaborative content item content specifically designated as reusable components are logically separated into reusable components, and the remaining content is included in the content item. It is also possible to treat all content as components, with some components designated as reusable components and other component designated as general content components.

Text component 536, image component 538, and data table component 540 are each designated as reusable components. In the editing view of the collaborative content item, these components are highlighted to the editor (as indicated by the shaded selection areas). As reusable components, these components may be selected from a reusable component catalog (as described below) and inserted anywhere amongst the content sections of a collaborative content item. The reusable components can be created and edited directly within the editing view of the collaborative content item. Once the reusable component is placed within the content of the collaborative content item, the reusable component can be moved or deleted as a unit, treating the reusable component similar to embedded or inline content.

Example System Environment with Reusable Component Manager

Figure 6:
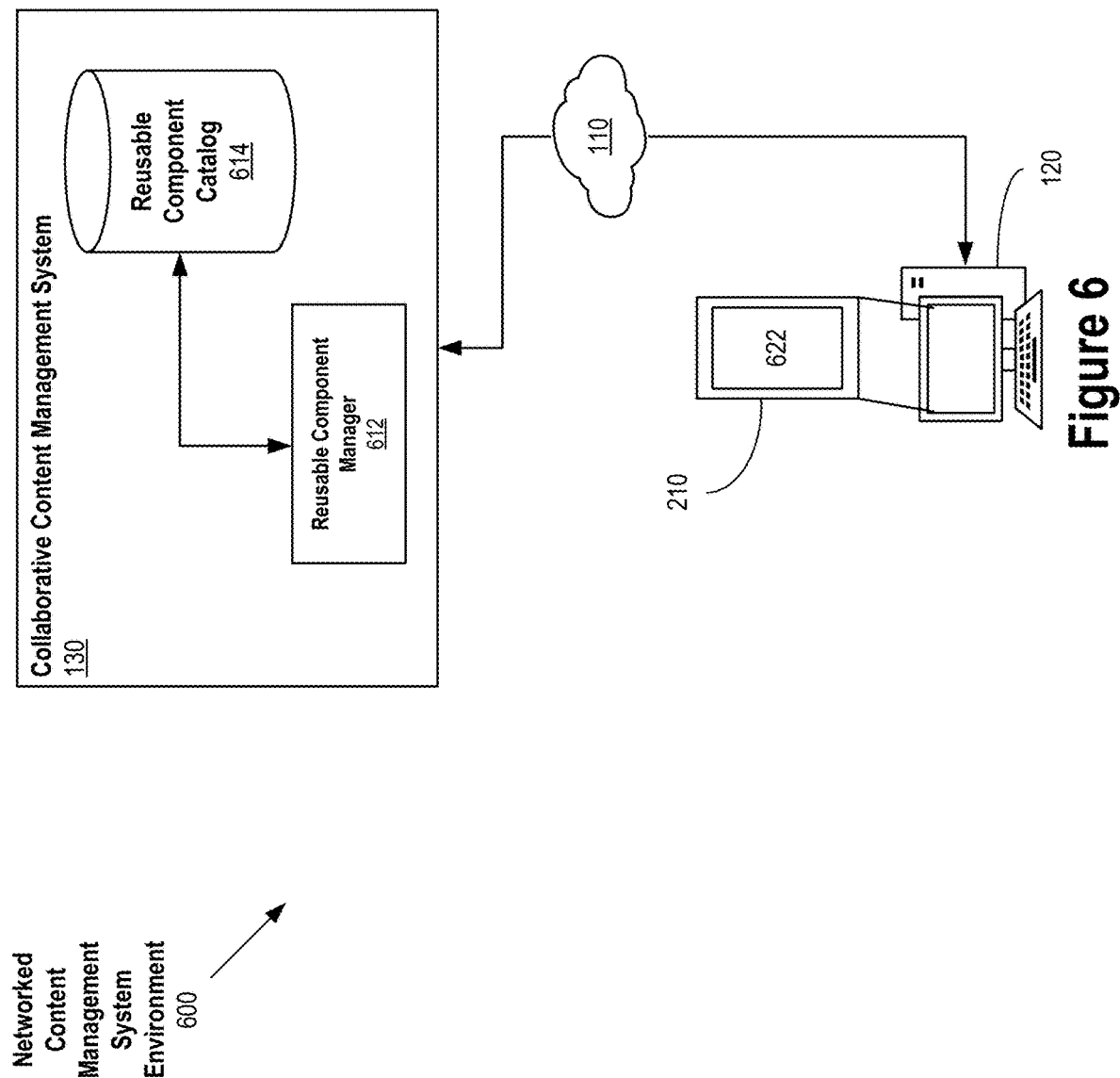
FIG. 6 is a functional diagram of an example collaborative content management system environment for managing reusable components.

FIG. 6 is a functional diagram of an example collaborative content management system environment 600 for managing reusable components, according to some embodiments. Environment 600 is provided to illustrate that the processes for providing collaborative content item 622 which includes reusable components is controlled by interoperation between a server-based networked collaborative content management system 130 and a client device 120. System 130 and device 120 are connected by data communications network 110.

System 130 includes reusable component manager 612 and reusable component catalog 614. Alternatively, reusable component catalog 614 may be stored on a third-party computer system. Reusable component manager 612 is provided to transmit the data and instructions corresponding to reusable components that may be included in collaborative content item 622 rendered on display 210 of client device 120.

For example, a user editing collaborative content item 622 (hereinafter, the "editor") may create a data table containing important organizational information. The editor may desire to reuse this table in other locations in the same collaborative content item 622 or in one or more other collaborative content items. Further, users on the editor's organizational team may wish to reuse this table in their collaborative content items.

According to some embodiments, the editor can select the table and then select a "create a new reusable component" option (e.g., from a drop-down menu). The editor may then be prompted with user interface controls asking for a title or name of the reusable component. The editor may then enter the title or name and then confirm the creation of the reusable component. In some embodiments, however, a unique title or name (e.g., "Table1") can be automatically suggested or assigned to the created reusable component by system 130 without user's intervention. For example, the unique title or name can include or be assigned based on the type of component (e.g., "Text," "Table," "Image"), the name of the user creating the component, the title of the document in which the component is being created, or any other attributes associated with the component. In some embodiments, the unique title or name may not include information identifying the component's position within the collaborative content item, and can be completely independent of the component's location or position within the collaborative content item.

In some embodiments, the editor may specify the location where the component is to be stored. For example, the editor may select that the reusable component be stored in a folder within the reusable component catalog. Furthermore, one or more default parameters may be added to the reusable component so that a location is automatically chosen for the reusable component based on the parameter(s). For example, the default parameters may include an identifier of the editor (user id), an identifier of a team or a group of users to which the editor belongs, or an identifier of the collaborative content item being edited.

Similarly, when the same or other editor edits the same or another collaborative content item, the editor may then select an "Insert an existing reusable component" option. The editor is then presented user interface controls showing the editor the reusable components that may be selected from reusable component catalog 614. The editor then may select the previously created reusable data table component from the catalog 614.

The rendering of collaborative content item 622, including the interface changes (discussed in more detail below), may be handled by client device 120. In contrast, the management of the actual content included in collaborative content item 622, as well as storage of the reusable component, may be handled, at least in part, by system 130. Thus, some embodiments encompass an integrated networked computing process environment for managing reusable components in a networked collaborative content management system.

Some embodiments in the context of environment 600 encompass a component use management process. For example, a particular editor may manage a particular reusable component. The editor may desire to find all of the collaborative content items in the content management system that use the reusable component that the editor manages.

According to some embodiments, the editor may browse the reusable component catalog. An option may be included to view related items of the reusable component, which shows all the collaborative content items that use the reusable component that the editor manages. If the editor decides to edit or delete the component, the editor can change the component and have that change propagated across all collaborative content items that use the component.

According to some embodiments, the editor may be prevented from deleting a component from the catalog if the component is currently being used by any collaborative content items. Additionally, a reusable component may be associated with an expiration date so that components that have expired can no longer be available for an editor to select from the catalog. However, a reusable component that has expired may continue to be used by collaborative content items that began using the component before expiration. After all collaborative content items using a component have been modified so that they no longer use the component, the editor may then successfully delete the component. Accordingly, uses of the component among collaborative content items in the content management system are managed to ensure that the integrity of each collaborative content item using a component is maintained.

Example Process for Inserting a Reusable Component

Figure 7:
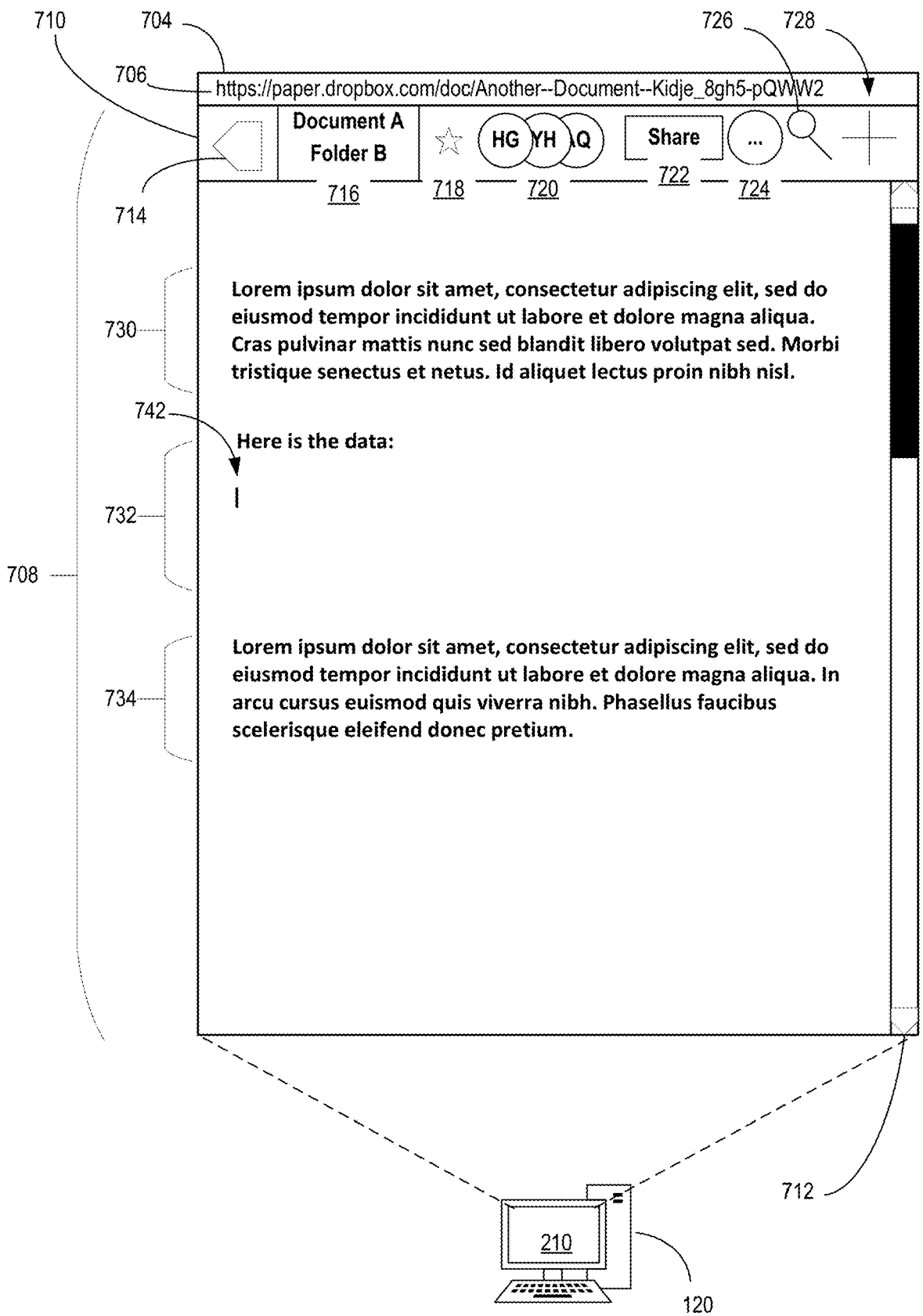
FIG. 7 is a first example of an editing view of a collaborative content item.
Figure 8:
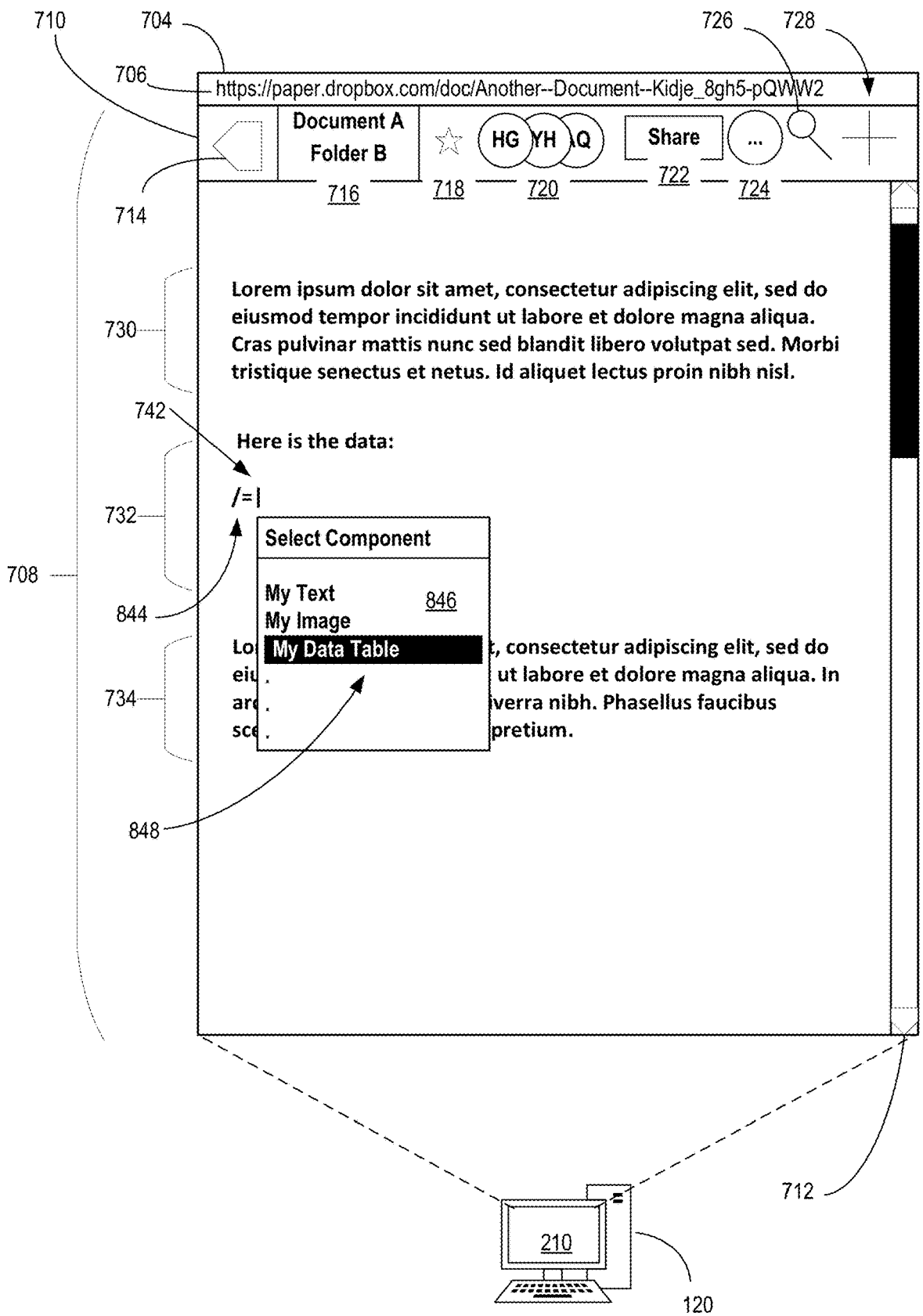
FIG. 8 is a second example of an editing view of a collaborative content item.
Figure 9:
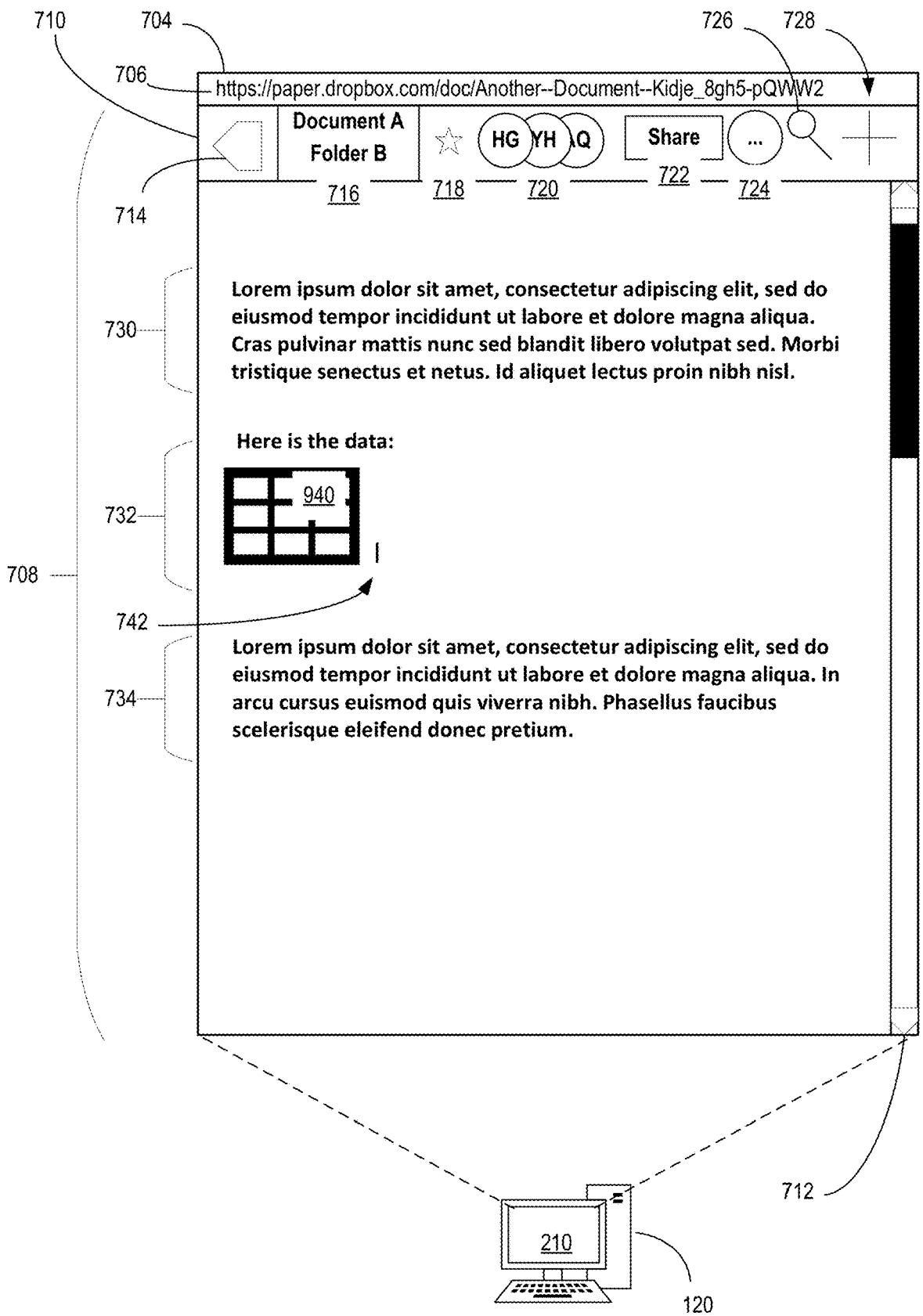
FIG. 9 is a third example of an editing view of a collaborative content item.

FIG. 7, FIG. 8 and FIG. 9 illustrate user interfaces and associated processes for using an inline reusable component selection expression to select and insert a reusable component into a collaborative content item. However, inline component selection expressions can be used by any type of application or computing device operating system supporting text character input from selections on a physical or soft keyboard or other text character input mechanism, and the use of inline component selection expressions is not limited to collaborative content item editing applications or device operating system supporting collaborative content item editing applications.

FIG. 7 depicts a collaborative content item editing application on a display 210 of a client device 120. Like with client device 120 of FIG. 5, client device 120 of FIG. 7 displays information on display screen 210. Display screen 210 is enlarged to depict details of the display. Display 210 includes a simplified display of a web browser application with the capability of viewing and editing collaborative content items.

In this example, display 210 shows a web browser 704. Web browser window 704 has a navigation field 706. Navigation field 706 indicates the Uniform Resource Locator (URL) of the current collaborative content item being viewed/edited and allows a user of web browser 704 to enter other URLs to navigate to other collaborative content item or web pages.

Since the current view of the collaborative content item is editing view, browser window 704 includes a sub-window referred to as content editing window 708. In this example, content editing window 708 displays a set of content sections (730, 732, 734) that are included in the collaborative content item. Collaborative content item within editing window 708 can be the same collaborative content item or a different collaborative content item than the collaborative content item within editing window 508 of FIG. 5. In the example of FIG. 7, collaborative content item within editing window 708 is a different collaborative content item than the collaborative content item within editing window 508 of FIG. 5. The content sections, and the content within the sections may be managed according to toolbar 710. More content sections may be available to include in a collaborative content item as represented by scroll bar 712.

Editing window 708 provides a toolbar 710 at the top of the window 708. Like toolbar 510 of FIG. 5, the toolbar 710 includes an interactive back button 714, title and folder information 716 pertaining to the collaborative content item being edited, an interactive "favorites" icon 718, following avatars 720, interactive share button 722, an interactive "options" button 724, an interactive search icon 726, and an interactive new collaborative content item icon 728 for creating a new collaborative content item.

Editing window 708 includes a text input cursor 742 at a current location in the editing window 708. The editing user may start an inline component selection expression by entering a predetermined character sequence. The user may enter a character of the predetermined character sequence by striking or selecting the corresponding key on a physical or virtual keyboard or speaking the character sequence, for example, or otherwise indicating the character sequence using an appropriate user input mechanism.

According to some of the techniques, the predetermined character sequence consists of a single forward slash character (e.g. '/'). However, the predetermined character sequence could consist of multiple characters. For example, the predetermined character sequence could consist of two consecutive forward slash characters (e.g. '//') or a forward slash followed by an equal character (e.g., '/='). Further, the predetermined character sequence may involve a non-printable character. For example, the predetermined character sequence could consist of the user holding down the control key (Ctrl) while entering the forward slash character (Ctrl+ '/'). Further, depending on current editing context, the user entering the predetermined character sequence may not be treated by the collaborative content item editing application as the start of an inline component selection expression such as, for example, when the user is editing a mathematical equation or in another editing context where the predetermined character sequence has a preferred different interpretation.

For the sake of providing clear examples, the examples provided herein assume that the predetermined character sequence is a single forward slash character followed by an equals character ('/='). However, as just described, the predetermined character sequence used to indicate the start of an inline component selection expression can be otherwise.

According to some of the techniques, upon the user entering the predetermined character sequence, the user may be prompted with a pop-up menu that provides a list of selectable available reusable components from which the user can select. The components may be listed in alphabetical order, for example, or any other order, such as mostly recently used components listed first, the most frequently used components first, the mostly recently created components listed first, or the most relevant components for the current editing context listed first. Further, the list of components can be access controlled such that the user can select from: (a) only those components the user has created, (b) only those components that users in a group (team) of users that the user belongs to has created, (c) only those components that are in collaborative content items that the user has access to, (d) only those components that are in collaborative content items that users in group (team) of users that user belongs to has access to, or a combination of two or more of (a), (b), (c), and (d). In some embodiments, the pop-up menu may enable the user to filter the list by component type (e.g., text, tables, images, etc.) or search for a specific component (e.g., either by component name or by the component's contents).

According to some of the techniques, if the user enters a predetermined undo key, such as backspace key (Backspace) or delete key (Delete), then the pop-up menu is removed from the display and the predetermined character sequence is treated literally (e.g., as part of the content of the collaborative content item being edited) and not as the start of an inline component selection expression.

According to some of the techniques, if, after entering the character sequence indicating the start of an inline component selection expression, the user enters another character sequence that does not match any available component, the predetermined character sequence is treated literally and not as the start of an inline collaborative content item editor expression.

According to some of the techniques, the pop-up menu is displayed in visual association with and proximity to the location of the predetermined character sequence, such as just below or above the line or the area of the editing area 708 where the user entered the predetermined character sequence so as not to visibly obstruct or not completely obstruct the inline component selection expression. For example, the top border of the pop-menu may be displayed directly below the character sequence, such as in the next line below the current editing line, or the area where the next line would be displayed below the current editing line, or if the current editing line is near the bottom of the currently viewable portion of the editing area 708, the bottom border of the pop-up menu many be displayed in the line above the current editing line. In any case, the pop-up menu can be configured to not visually obstruct (or not completely obstruct) the inline component selection expression so that the user can at least partially view the expression while entering it.

The pop-up menu allows the user to see what components are available. Each item in the menu may correspond to a reusable component and may provide the name of the component. Each item may provide additional information about the component such as the type of the component, a preview of the component's contents, the title of the content item in which the component was created, the name of the user who created it, the titles of the content items in which the component is being reused, etc. The pop-up menu may also be interactive. For example, the user may change input modes (e.g., from keyboard to mouse) to select a component from the menu, or to get more information about the component. However, because the pop-up menu may not completely obstruct the inline component selection expression, the user does not need to change input modes or input areas to select a component. Yet, at the same time, the pop-up menu may provide useful information about a component such as the type of the component, the creator of the component, etc.

According to some of the techniques, after the user enters the predetermined character sequence indicating the start of an inline component selection expression, as the user enters characters of the name of a component, the selectable items displayed in the pop-up menu change to include only those that match or prefix match the characters entered. For example, if the user enters the character sequence "/s", then the pop-up menu may display only reusable components having a name that starts with the letter 's'.

According to some of the techniques, the content item editing application may auto-complete the component in the inline component selection expression for the user, e.g., with characters in a top-matching component name.

According to some of the techniques, if the characters entered by the user for the component name unambiguously refers to one component, then the content item editing application may auto complete the component name in the inline component selection expression for the user with the unambiguous component name. For example, if the "my data chart" component is the only available component with a name that starts with "my", then after the user enters the character sequence "/my", the content item editing application may automatically complete the character sequence to display "/my data chart". As an alternative, the only available component name that matches the entered characters may be offered as an option (e.g., by highlighting the full component name in the component selection pop-up menu) which the user can accept by selecting a predetermined key such as, for example, the tab (Tab) or enter (Enter) key. Upon selecting the predetermined key when the option is offered, the character sequence may be automatically completed with the full name of the component. Alternatively, the user can ignore the offered option and continue selecting other characters (e.g., if the user intended to enter a literal sequence of character and not an inline component selection expression).

Turning now to FIG. 8, it shows editing window 708 after the user has entered the predetermined character sequence 844 consisting of a forward slash character and an equal sign ('/=') following whitespace. As a result of entering the predetermined character sequence 844, pop-up menu 846 is displayed. Pop-up menu 846 includes a list of selectable items where a selectable item corresponds to a reusable component available for selection. Pop-up menu 846 may or may not visibly obstruct some or all of the inline component selection expression.

Pop-up menu 846 displayed as a result of entering the predetermined character sequence 844 can be displayed inline with the inline component selection expression so as not to require the user to move focus away from the current editing location 742 in the editing window 708 in order to interact with the pop-up menu 846. In this context, pop-up menu 846 is considered "inline" with the inline component selection expression 844 if the display position of the menu in the user interface is relative to or dependent on the display position in the user interface of the inline component selection expression 844, or a portion thereof, or the current editing position 742 (e.g., the current position of the text input cursor).

For example, pop-up menu 846 is displayed editing window 708 just below the inline component selection expression 844 such that the user can select a component without losing context of the current editing position 742 which could happen if the user was required to interact with the toolbar at the top of the editing window 708 in order to select the component.

Turning now to FIG. 9, it shows editing window 708 after the user has selected the "My Data Table" item 848 from the pop-up menu 846 as depicted in FIG. 8. As a result, the inline component selection expression 844 is automatically replaced by the collaborative content item editing application with the selected reusable component 940. In particular, the replacement starts at the location in the editing window 708 where the user started entering the inline component selection expression 844 (e.g., the location of the input cursor 742 as depicted in FIG. 7). After the replacement, the current location of the input cursor 742 has moved to a location in editing window 708 following the reusable component 940 so that the user can continue inputting (e.g., typing) from there.

As illustrated by the example user interfaces of FIGS. 7, 8, and 9, the user is able to cause automatic initiation of a reusable component selection function without having to change input modes or input areas. In particular, by entering the sequence of characters "/=" inline with content of the collaborative content item from a current text cursor position in the editing area (e.g., the location of text cursor 742 in editing window 708 of FIG. 7), the user is able to cause the collaborative content item editing application to automatically causing pop-up menu 846 to be displayed to the user for selecting a reusable component to insert into the collaborative content item.

While in the example of FIGS. 7, 8, and 9 an inline component selection expression is used to select and insert a reusable component into a collaborative content item at a desired location that is inline with content of the content item, other user input modes may be used in other embodiments. For example, while the editing cursor is at a desired location inline with content of the content item, the user may select an "insert reusable component" option in a drop-down or pop-up menu that is revealed by other prior user input action (e.g., a right-click action using a pointing device such as a mouse or a long-press or double-tap touch gesture directed to a touch-sensitive surface.) Upon selecting the "insert reusable component" option the user may be presented with user interface controls (e.g., pop-up menu 846) for selecting and inserting a reusable component at the desired location. In some embodiments, the prior user input action is selecting an "insert reusable component" option (not shown) available in the toolbar (e.g., 710).

Tethering Modes

In some embodiments, a reusable component inserted into a collaborative content item can be in one of various different "tethering modes." The tethering mode of the component can be specified when the component is created or edited as described in greater detail below. The tethering mode of the component affects if the component can be edited or modified by users that insert the component into collaborative content items and, if so, what effect editing or modifying the component has on its status as a reusable component in the content items into which it is inserted.

In some embodiments, a reusable component inserted into a collaborative content item can be in a "one way" tethering mode. In this mode, the reusable component cannot be edited or modified by users that insert (inserting users) the component into collaborative content items even if the inserting users can edit or modify other portions of the collaborative content items. However, the user that created the reusable component (creating user) may still be able to edit or modify the component in collaborative content items. When the creating user applies a set of one or more edits to the reusable component in a collaborative content item, then the instances of the reusable component inserted by the inserting users into collaborative content items are updated to reflect the set of edits by the creating user. In this way, sets of edits to reusable components can be centralized with the creating user yet still be replicated to other instances of the reusable component. In some embodiments, a group of users have permission to edit or modify the reusable component in a one-way tethering mode as opposed to just a single creating user.

In some embodiments, a reusable component inserted into a collaborative content item can be in a "severable one way" tethering mode. This mode is like the "one way" tethering mode described in the previous paragraph except that inserting users can edit or modify an instance of the reusable component in a collaborative content item. However, once the instance is edited or modified it is "severed" from edits or modifications to other instances of the reusable component such as edits or modifications to an instance by the creating user. In this way, the severed instance is no longer an instance of the reusable component but instead becomes independent content of the collaborative content item. The inserting user can continue to edit or modify the severed instance without affecting instances of the reusable component. However, the severed instance will also not be updated to reflect edits or modifications to instances of the reusable component.

In some embodiments, a reusable component inserted into a collaborative content item can be in a "two way" tethering mode. In this mode, either or both inserting user and the creating user can edit or modify an instance of the reusable component and the edits or updates will be reflected (replicated) to other instances of the reusable component. The system may provide a conflict resolution mechanism to resolve concurrent editing conflicts between edits to different instances of the reusable component where an edit is made without knowledge of other edits. Such mechanism may automatically resolve concurrent editing conflicts (e.g., using a configurable heuristic such as most recent edit wins) or resolve such conflict with the aid of user input.

In some embodiments, the current tethering mode of an instance of a reusable component is visually indicated in a graphical user interface (e.g., in editing window 708). For example, different visual indications (different highlighting, different shading, different coloring, different icons, etc.) displayed in conjunction with the reusable component instance may indicate whether the instance is in a "one-way," "severable one way," or "two way" tethering mode. In some embodiments, the visual indication is displayed in response to user input that hovers over or otherwise selects the reusable component instance displayed in the editing window 708.

Example Selection of a Reusable Component

Figure 10:
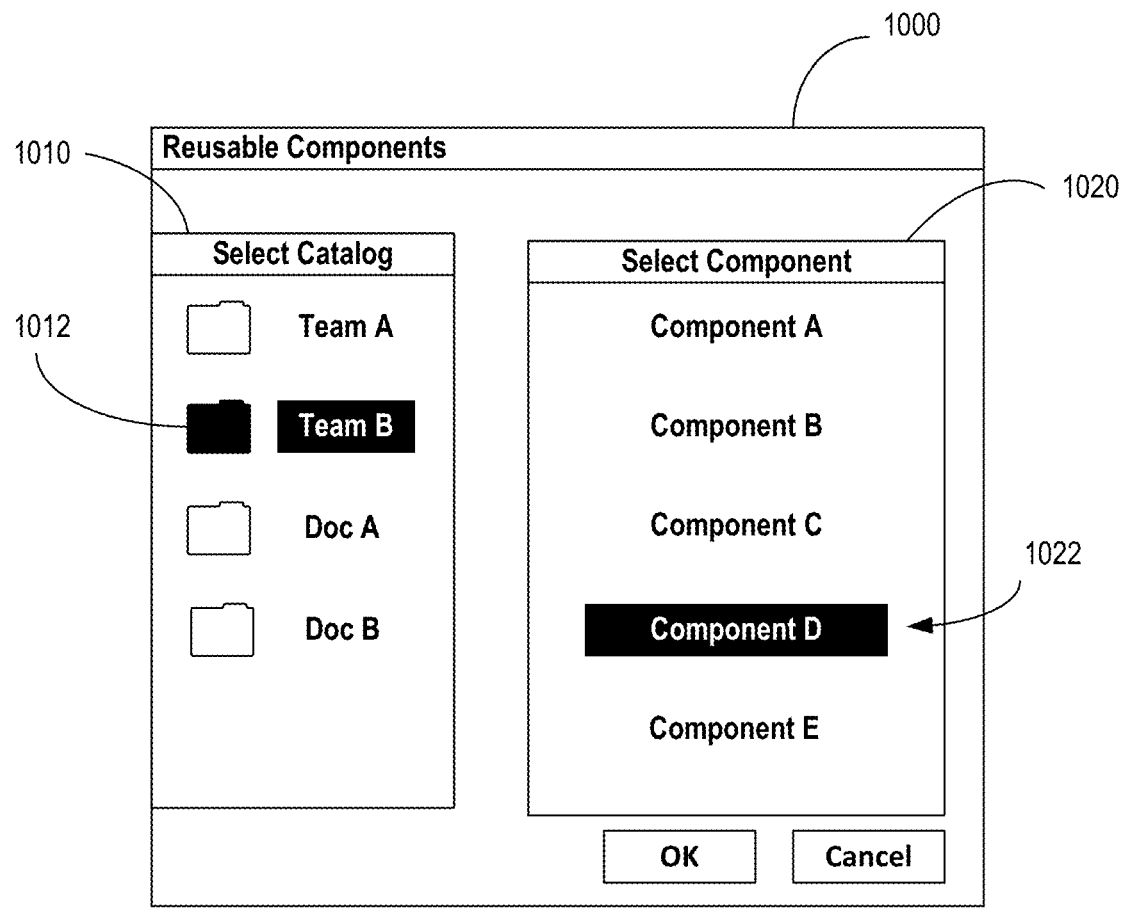
FIG. 10 depicts an example reusable component selector graphical user interface window for selecting a reusable component to insert into a collaborative content item.

FIG. 10 depicts a reusable component selector graphical user interface window 1000 for selecting a reusable component to insert into a collaborative content item. Selector window 1000 includes a catalog selector 1010 and catalog inventory field 1020. In some embodiments, selector window 1000 is displayed instead of pop-up menu 846 in the context of a user selecting and inserting a reusable component into a collaborative content item.

Catalog selector 1010 allows the editor of a collaborative content item to select among a group of catalogs for which the editor desires to select a reusable component. Each catalog (e.g., 1012) is indicated by an identifier or title of the catalog. For example, the "Team A" catalog may allow the editor to select from among the reusable components used in collaborative content items accessible to users (members) of Team A. Likewise, the "Team B" catalog may allow the editor to select from the reusable components used in collaborative content items accessible to users (members) of Team B. The "Doc A" catalog may allow the editor to select from among the reusable components used in collaborative content item "Doc A." Likewise, for "Doc B" except to select from among the reusable components used in collaborative content item "Doc B."

The catalogs that are available for selection in catalog selector 1010 may vary depending on the particular editor's access permissions. For example, "Team A" and "Team B" may be presented in catalog selector 1010 because the editor is a member of both Team A and Team B. Collaborative content items "Doc A" and "Doc B" may be presented in catalog selector 1010 because the editor created these collaborative content items or because these collaborative content items were shared with the editor by another user.

The reusable components of the selected catalog are then shown in catalog inventor field 1020. Field 1020 shows a list of reusable components (e.g., 1022) for selecting a particular reusable component. Selector window 1000 may be presented at any time corresponding to any location of a collaborative content item for content items that permit the use of reusable components. In some cases, the catalogs available for a particular collaborative content item, user, or group (team) of users may be limited to a particular set of catalogs, and therefore not usable by in other collaborative content items, by other users, or by other groups (teams) of users.

Example Creation and Editing of a Reusable Component

Figure 11:
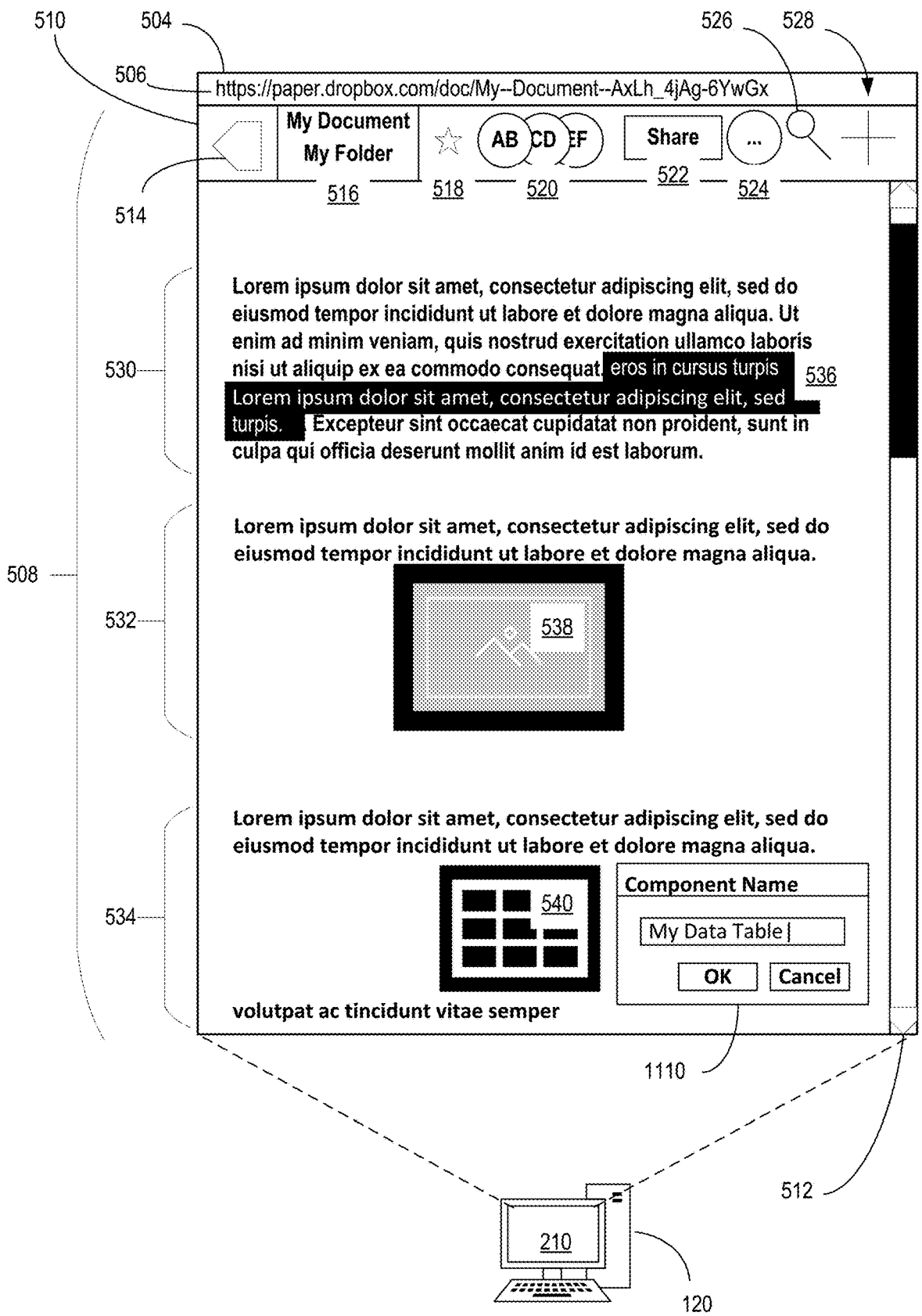
FIG. 11 depicts an example of creating and editing a reusable component.

FIG. 11 depicts creating and editing a reusable component. After selecting data table 140 and selecting a "Create new component" option, if data table 140 has not yet a reusable component, or "Edit existing component" option, if data table 140 is already a reusable component, the user is presented with dialog 1110. Dialog 1110 allows the user to provide a name for the component. In this example, the user has entered the name "My Data Table." This name is used to refer to the component by the user or others when inserting the component into other locations of the collaborative content items or into other collaborative content items.

Although not depicted in FIG. 11, dialog 1110 may present other options to the user for creating and editing a reusable component. For example, dialog 1110 may include a notification that indicates that creation of a new reusable component or editing an existing reusable component is subject to approval before being stored to the reusable component catalog. A collaborative content item may have a number (team) of editors that all have access to the collaborative content item. The creation or edit of a reusable component may pass through an automatic or manual approval process before the new or edited reusable component may be used by other editors not members of the team or in other collaborative content items.

As another example of a possible field, dialog 1110 may provide an expiration date field to be included with the new or edited reusable component that sets an expiration date for the reusable component. When a reusable component is expired, it may no longer be available for an editor to select it for inclusion in a collaborative content item from the reusable content catalog.

As yet another example of a possible field, dialog 1110 may allow the user to specify the tethering mode for the reusable component. For example, dialog 1110 may provide options for specifying at least one of the following tethering modes: one way, severable one way, and two way.

Example Process for Rendering a Reusable Component

Figure 12:
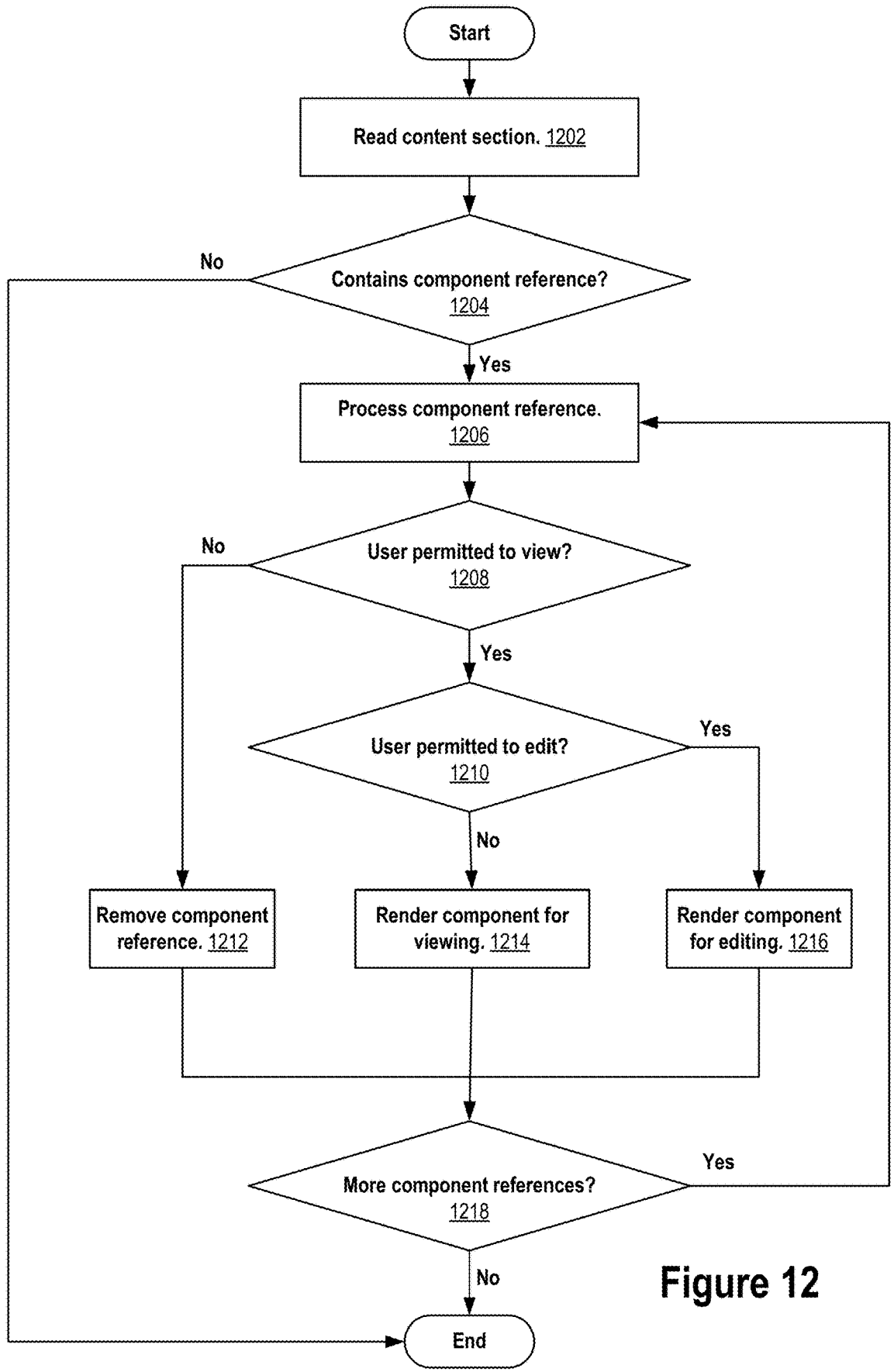
FIG. 12 is a flow diagram representing an example method for rendering a reusable component.

FIG. 12 is a flow diagram representing a method for rendering a reusable component. When method 1200 starts, a collaborative content item has been created that refers to one or more reusable components within one or more content sections of the collaborative content item. A content section may encompass a word, words, a sentence, sentences, a paragraph, paragraphs, or other continuous portion, section, or fragment of the collaborative content item content. Method 1200 continues with read content item operation 1204.

Read content section operation 1202 reads the data corresponding to the content section in the collaborative content item into computer storage media for processing. The content section that is read is identified according to a content section value that uniquely identifies the content section from other content sections in the collaborative content item. Once the content section data is read into storage media, method 1200 continues at decision operation 1204.

Decision operation 1204 makes a determination during read operation 1202 of whether a reusable component is found in the content section data. If a reusable component is not found, method 1200 ends and processing proceeds onto other tasks for handling the content section data and rendering the collaborative content item. If a reusable component reference is found in the content section data, then processing continues with processing component reference operation 1206.

Processing operation 1206 parses the reusable component reference to determine the identifier of the component and other information for identifying and location the component. Once the reusable component is identified by parsing the reusable component reference, the component is loaded into storage media, either from a local component cache or by downloading the component over a data communications network from the component catalog.

View permission decision operation 1208 determines whether the current user of the collaborative content item has permission to view the reusable component. Access controls associated with the reusable component or the collaborative content item may prohibit the user from viewing the reusable component. For example, even though the current user may have permission to view the collaborative content item, the current user may not have permission to view the reusable component. In this case, the current user may view other portions of the collaborative content item that are not the reusable component. In some embodiments, the lack of view permission for the reusable component may be indicated to the current user by an appropriate icon or graphic or the like. For example, an "unavailable" or "missing" message or icon may be displayed inline with the content of the collaborative content item where the reusable component would have been displayed if the current user had permission to view the reusable component. In some embodiments, the user is provided with user interface controls for requesting permission to view the reusable component. By activating the user interface controls, an e-mail message or other message may be sent to a user with the ability to grant the current user view permission to the reusable component. For example, the user might be an administrator of a team of users that have permission to view the reusable component. If the user takes a user input action that grants the current user permission to view the reusable component, then the system may then grant the current user the necessary permissions to view the reusable component. Otherwise, the current user may continue to lack view permission to view the reusable component.

If it is determined 1208 that the current user does not have view permission for the reusable component, then method 1200 proceeds to operation 1212 where the component reference is removed from the collaborative content item and the component is not rendering for viewing by the user. Method 1200 then continues to decision 1218 to determine if there are more component references of the content section to process 1206. If there are no more component references to process 1206, then method 1200 ends.

However, if it is determined 1208 that the current user does have permission to view the reusable component, then method 1200 continues to edit permission decision 1210. Edit permission decision 1210 determines whether the type of rendering of the component should be to either: (1) render an editable version of the component (e.g., the component in in a "severable one way" or "two way" tethering mode and the current user has permission to edit the component) or (2) render a view-only version of the component (e.g., the component is in a "one way" tethering mode or the current user does not have permission to edit the component).

If an editable version, then the user can edit the component and such edits will automatically propagate (replicate) to all other instances of the component in the collaborative content item and in other collaborative content items of the collaborative content management system. If a view-only version, then the user can view the component but cannot edit it. Whether the component is rendered in an editable or a view-only version, it will automatically reflect any edits made by other users that have edit permission to the component, since those edits will automatically propagate (replicate) to any instance of the reusable component in any collaborative content item.

If the component is being rendered for editing, the method 1200 moves to operation 1216. Otherwise, the method proceeds to operation 1214. At operation 1216, the component is rendered in the editing window of the collaborative content item so that the user can made edits or changes to the component. At operation 1214, the component is rendered in the editing window of the collaborative content item so that it can be viewed by the user but no so that the user can edit or make changes to the component.

Method 1200 may be repeated as many times as necessary for the various content items that may be included in the collaborative content item.

Reusable Component Example

Figure 13:
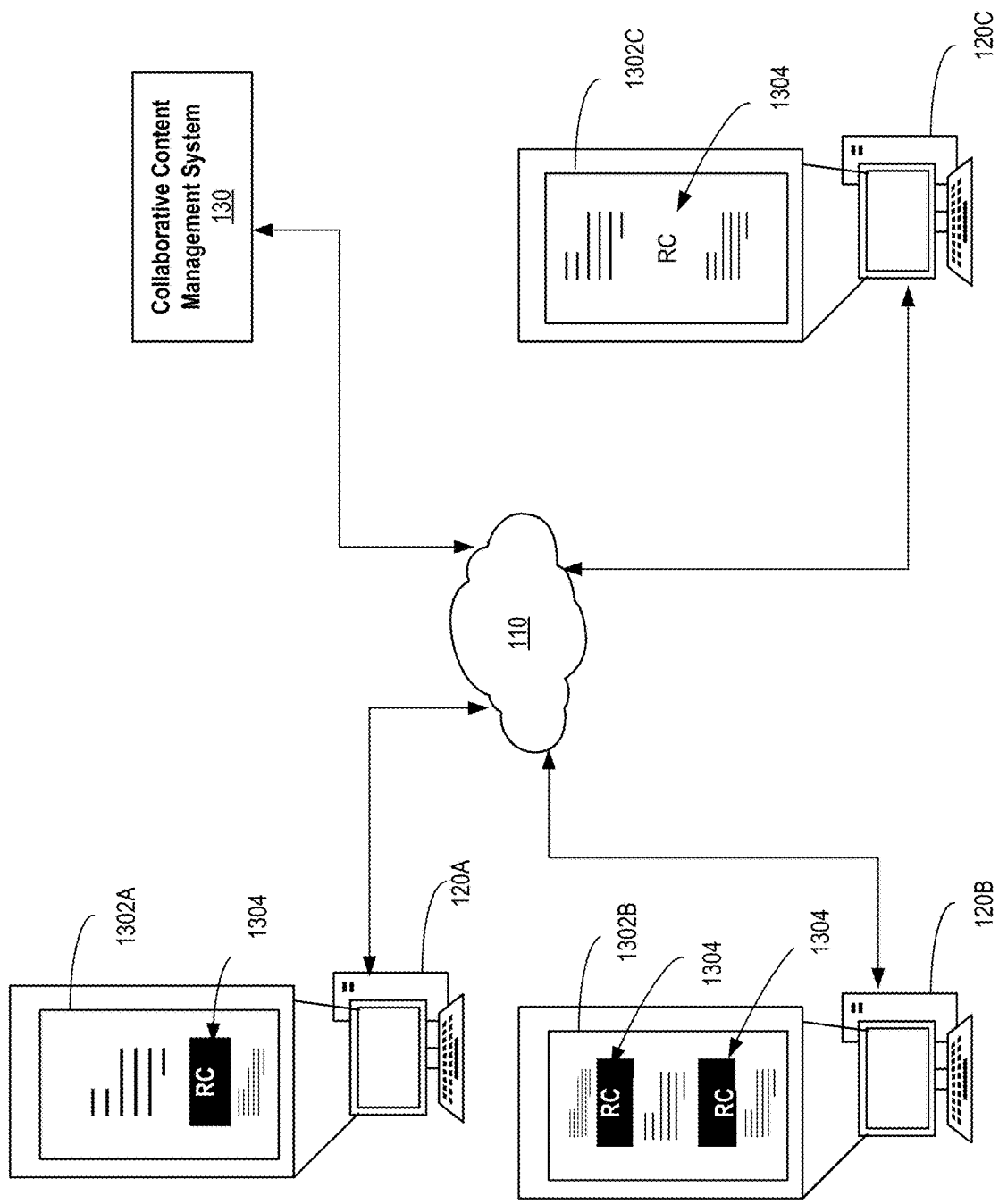
FIG. 13 is a schematic illustrating a reusable component example.

FIG. 13 illustrates a replication example, according to some embodiments. Client devices 120A, 120B, and 120C and collaborative content management system 130 are connected to network 110.

Client device 120A displays collaborative content item 1302A. Client device 120B displays collaborative content item 1302B. Client device 120C displays collaborative content item 1302C. Each of collaborative content items 1302A, 1302B, and 1302C may be retrieved from collaborative content management system 130 over network 110 by the respective client device 120A-C at which they are displayed. Collaborative content items 1302A, 1302B, and 1302C may all refer to the same content item or to different content items.

Collaborative content item 1302A includes reusable component 1304 once at a particular location inline with other content of collaborative content item 1302A. Collaborative content item 1302B includes reusable component 1304 twice at two different locations inline with other content of collaborative content item 1302B. Collaborative content item 1302C includes reusable content item 1304 once at a particular location inline with content of collaborative content item 1302C. Reusable component 1304 may be a reusable text component, a reusable data table component, a reusable image component, or other type of reusable component. The locations of reusable component 1304 in collaborative content items 1302A-C may not necessarily correspond and the locations may vary between collaborative content items 1302A-C. Indeed, collaborative content items 1302A-C can be different collaborative content items with different content In some embodiments, reusable component 1304 can be rendered in different ways and the user can select one of the ways in which to render the reusable component in a collaborative content item. For example, reusable component 1304 may encompass data representing the current date and the date data can be used to render reusable component 1304 as text or as an image. An example of text for a current date reusable component might be "Wednesday, Jul. 15, 2020" and an example of an image might be a graphic representing a paper-based flip calendar showing Jul. 15, 2020. Thus, by user selection, the same reusable component can be rendered differently to different users, in different collaborative content items, or to the same user in the same collaborative content item at different times.

In some embodiments, when inserting reusable component 1304 into a collaborative content item the user can select how reusable component 1304 should be rendered (e.g., as text or as an image) in the collaborative content item. The user may also later decide to change the rendering after inserting reusable component 1304 into the collaborative content item. For example, the user may later switch the rendering configuration from text to image (e.g., by selecting an option from a drop-down or pop-up menu).

In some embodiments, a default rendering is automatically selected based on the inline location of reusable component 1304. For example, if reusable component 1304 is inline with text of a collaborative content item such as inline with a text sentence, then the default rendering may be as a text. Alternatively, if reusable component 1304 is not inline with text such as at a location in the collaborative content item that is between sentences or paragraphs, then the default rendering may be as an image or graphic. Thus, the same reusable component can be automatically rendered differently in different inline contexts.

In some embodiments, reusable component 1304 encapsulates data and executable logic (executable at a client device) for rendering the data of reusable component 1304 differently either in response to a user selection, or automatically depending on the detected inline context. For example, reusable component 1304 may have a first function for rendering data of reusable component 1304 as text and a second function for rendering data of reusable component 1304 as a graphic or image. The appropriate function can be invoked to render the data inline with content of a collaborative content item in response to a user selection of a rendering option corresponding to the function, or in response to automatically detecting an inline context corresponding to the function.

In some embodiments, a reusable component presented inline with content of a collaborative content item is highlighted or otherwise visually distinguished from other content of the collaborative content item so that the user can easily see that the content is part of a reusable component and not other type of content. For example, reusable component 1304 is highlighted in collaborative content item 1302A to visually distinguish it from other content of collaborative content item 1302A. Various different types of visual distinguishing are possible including, but not limited to, highlighting, coloring, shading, or display of a graphic or icon near the reusable component. In some embodiments, the visual distinguishing appears in response to user input such as, for example, user input that selects or hovers over the reusable component. In any case, the visual distinguishing is such that the user can visually perceive that content is a reusable component and not other type of content of the collaborative content item.

In some embodiments, a reusable component presented line with content of a collaborative content item is highlighted or otherwise visually distinguished from other content of the collaborative content item so that the user can easily see both that: (1) the content is part of reusable component and (2) that the reusable component is read-only for the user. For example, this is represented by the non-bolded reusable component 1304 in collaborative content item 1302C. For example, the inverse text color highlighting of reusable component 1304 in collaborative content item 1302A may indicate that the content item is both part of a reusable component and editable by the user of device 102A and the non-bolded highlighting of reusable component 1304 in collaborative content item 1302C may indicate that the content item is both part of a reusable component and read-only for the user of device 102C.

Reusable component 1304 is indicated by highlighting as editable in collaborative content items 1302A and 1302B. In accordance with some embodiments, an update or edit (e.g., a change to the text content of reusable component 1304, a reconfiguration of the formatting of reusable component 1304, etc.) to reusable component 1304 in either of those collaborative content items 1302A and 1302B will cause the update or edit to be replicated from the device (102A or 102B) at which the update or edit was made to collaborative content management system 130 and from collaborative content management system 130 to the other devices 102A, 102B, or 102C where reusable content 1304 is automatically updated in the other collaborative content items 1302A, 1302B, and 1302C to reflect the update or edit. For example, if the reusable component 1304 is updated or edited at one of the two locations in collaborative content item 1304B, then all of the following reusable component 1304 locations are automatically updated to reflect the update or edit:

the other (non-edited) location of reusable component 1304 in collaborative content item 1304B, the location of reusable component 1304 in collaborative content item 1304A, and the location of reusable component 1304 in collaborative content item 1304C.

In some embodiments, when a reusable component is updated or edited in a collaborative content item that includes the reusable component at multiple locations in the collaborative content item, the other locations in the collaborative content item are automatically updated without needing to receive the update or edit over a network from collaborative content management system.

Example Process for Saving a Reusable Component

Figure 14:
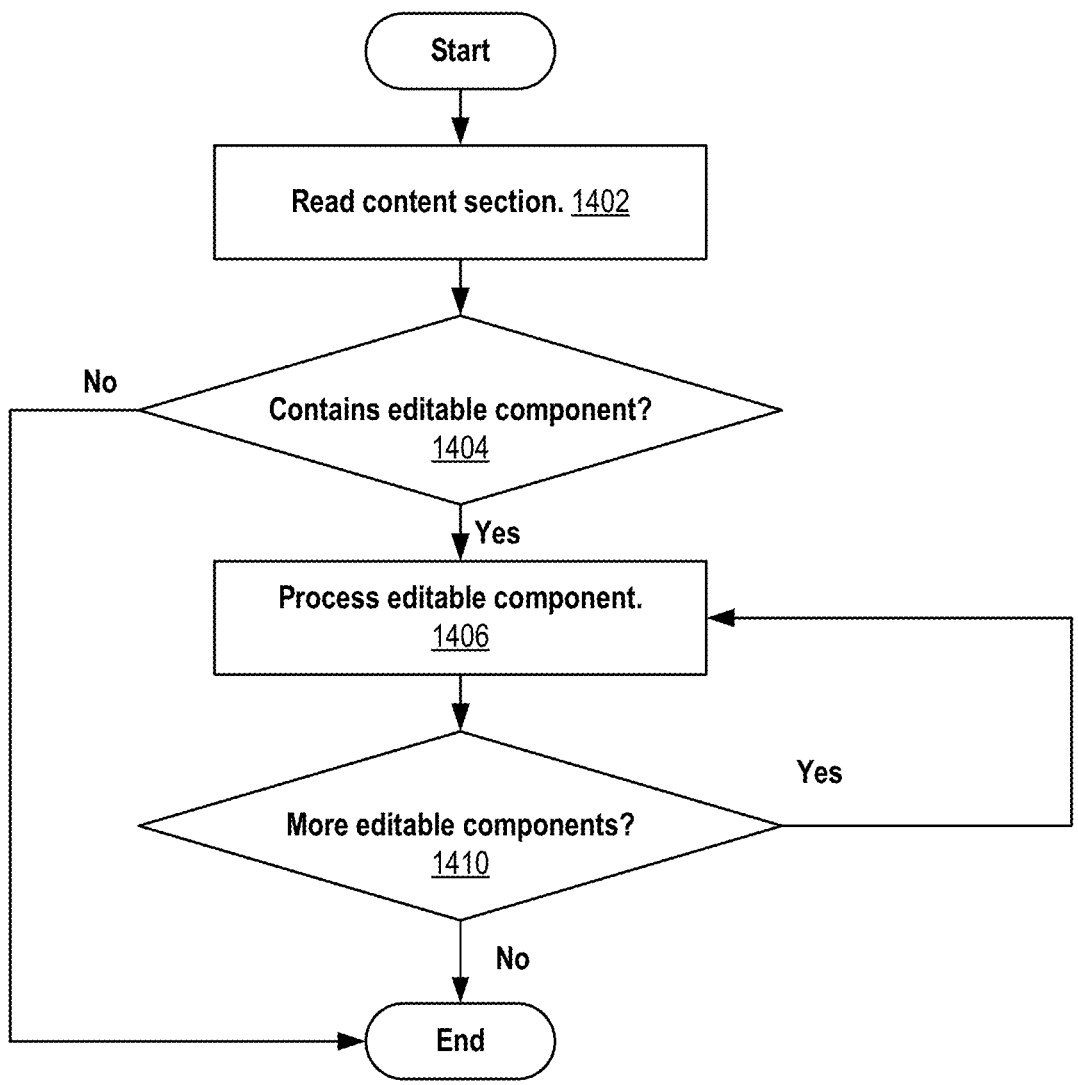
FIG. 14 is flow diagram of an example method for saving a reusable component.

FIG. 14 is flow diagram of a method for saving a reusable component. When method 1300 starts, a version of a collaborative content item that includes at least one content item has been rendered. Method 1400 continues at read content item operation 1402.

At operation 1402, the rendered content section is read for an editable version of a reusable component. An editable version of a reusable component may contain additional information (additional to the view-only version of the reusable component) that identifies itself as editable by the current user of the collaborative content item. As the content section data is read 1402, method 1400 proceeds to decision 1404.

At decision 1404, it is determined whether the content section contains an editable version of a reusable component. If not, then method 1400 ends. Otherwise, if the content section contains an editable version of a reusable component, then method 1400 proceeds to operation 1306.

At operation 1406, the edit version of the reusable component is processed (e.g., parsed). Process operation 1406 may determine the identifying information associated with the component and other information used for saving the reusable component. For example, processing the component may include identifying whether the component is a new component or an existing component. When the component is processed, and a change or edit has been made to the content of the component, the change may be sent to the reusable component catalog. The reusable component catalog then updates the reusable component within the catalog for future requests for the component. The change may also be submitted to an approval process before the catalog is updated.

Similar to method 1200, process 1400 may be repeated as many times as necessary for the various content sections that may be included in a particular collaborative content item. Once method 1400 is completed for each content item, a saved version of the collaborative content item that represents the latest version of the collaborative content item is stored in the content management system.

Computing System Implementation

Any of the above techniques may be implemented using a computing system.

A computing system may encompass one or more processors and storage media. The one or more processors and the storage media are provided by one or more computing devices of the computing system. An example computing device 1500 with processor(s) 1504 and storage media (e.g., storage system 1510, ROM 1508, or main memory 1506) is described below with respect to FIG. 15. The storage media stores instructions which, when executed by the computing system, cause the computing system to perform any of the above techniques.

One or more non-transitory media may store instructions which, when executed by the computing system, cause the computing system to perform any of the above techniques.

A computing device of the computing system may host one or more hypervisors that operate on the computing device and emulate or virtualize computing hardware. A hypervisor can be a Type-1 (bare-metal hypervisor) or Type-2 hypervisor (hosted hypervisor), for example.

A computing device of the computing system may employ operating system-level virtualization in addition to, or in the absence of, one or more hypervisors. With operating system-level virtualization, the operating system kernel facilitates multiple isolated user space instances sometimes referred to as containers, zones, virtual private servers, partitions, virtual environments, virtual kernels, jails, etc.

The computing system may encompass multiple computing devices in a distributed computing environment. Together, the multiple computing devices performs any of the above techniques. In such an environment, computing devices may be continuously, periodically, or intermittently interconnected by one or more data communications networks (e.g., one or more Internet Protocol (IP) networks.)

Example Computing Device

Figure 15:
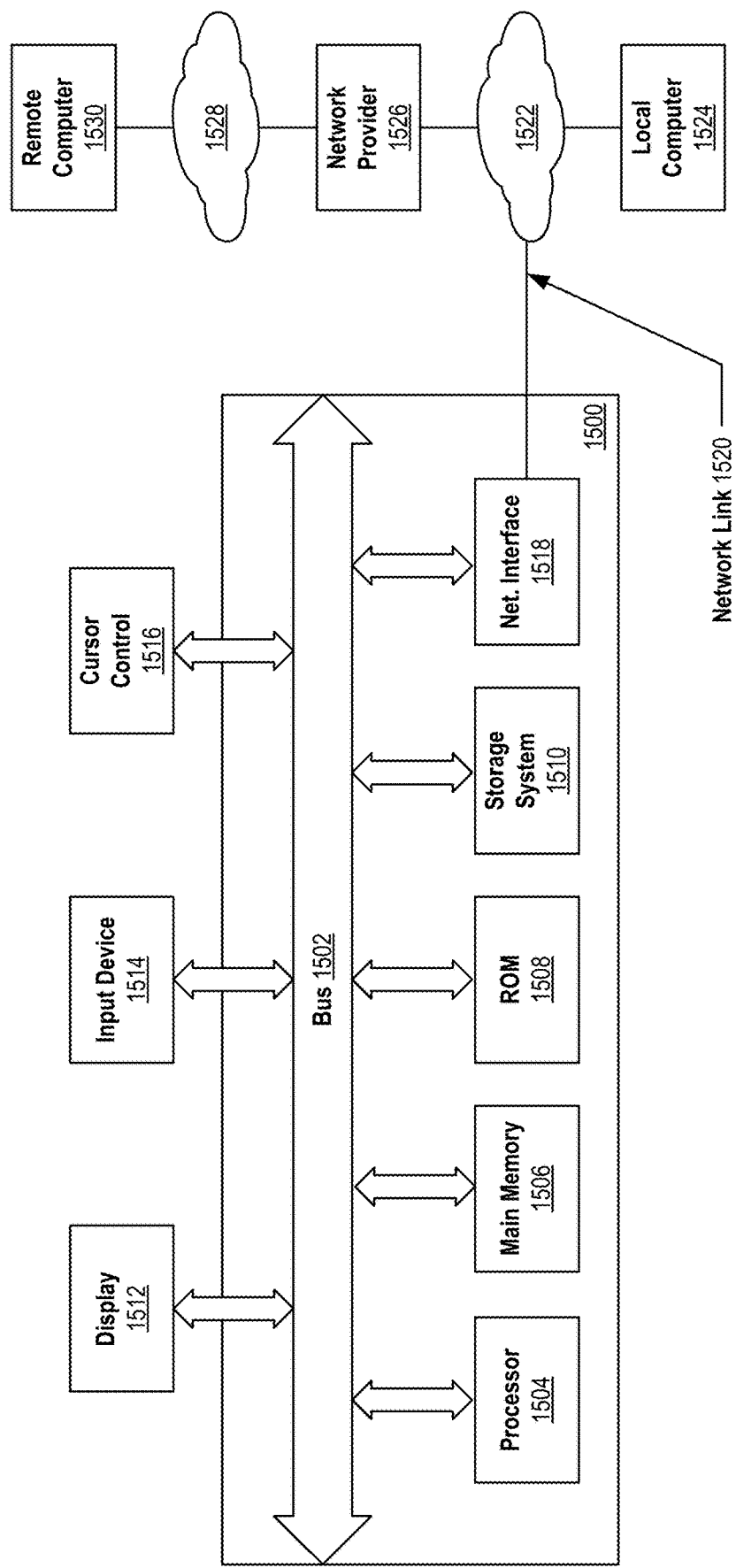
FIG. 15 illustrates an example computing device.

FIG. 15 illustrates example computing device 1500. Computing device 1500 includes bus 1502 or other communication mechanism for communicating information, and one or more hardware processors 1504 coupled with bus 1502 for processing information. Computing device 1500 is just one example of a possible computing device that may be used in an implementation. Other computing device configurations having more, fewer, or different components may be used in an implementation.

Hardware processor(s) 1504 include, for example, one or more general-purpose microprocessors, central processing units (CPUs) or cores thereof, graphics processing units (GPUs), or systems on a chip (SoCs).

Computing device 1500 also includes main memory 1506, implemented by one or more volatile memory devices, coupled to bus 1502 for storing information and instructions to be executed by processor(s) 1504. Main memory 1506 also may be used for storing temporary variables or other intermediate information during execution of instructions by processor(s) 1504.

Computing device 1500 includes read-only memory (ROM) 1508 or other static storage device coupled to bus 1502 for storing static information and instructions for processor(s) 1504.

Storage system 1510 implemented by one or more non-volatile memory devices is provided and coupled to bus 1502 for storing information and instructions.

Computing device 1500 is coupled via bus 1502 to display 1512, such as a liquid crystal display (LCD), a light emitting diode (LED) display, or a cathode ray tube (CRT), for displaying information to a computer user. Display 1512 may be combined with a touch sensitive surface to form a touch screen display. The touch sensitive surface may be an input device for communicating information including direction information and command selections to processor(s) 1504 and for controlling cursor movement on display 1512 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 1514, including alphanumeric and other keys, is coupled to bus 1502 for communicating information and command selections to processor(s) 1504. Another type of user input device is cursor control 1516, such as, for example, a mouse, a trackball, or cursor direction keys, for communicating direction information and command selections to processor(s) 1504 and for controlling cursor movement on display 1512. For example, his input device may have two degrees of freedom in two axes, a first axis (e.g., x) and a second axis (e.g., y), that allows the device to specify positions in a plane.

Computing device 1500 in response to processor(s) 1504 executing instructions contained in main memory 1506 may performs any of the above techniques. Such instructions are read into main memory 1506 from another storage medium, such as storage system 1510. Execution of the instructions contained in main memory 1506 may cause processor(s) 1504 to perform any of the above techniques. Hard-wired circuitry may be used in place of or in combination with instructions to perform any of the above techniques.

The term "storage media" as used herein refers to any non-transitory media that store data or instructions that cause a machine to operate in a specific fashion. Such storage media may comprise non-volatile media (e.g., storage system 1510) or volatile media (e.g., main memory 1506). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 1502. Transmission media can also take the form of acoustic or light waves, such as those generated during radio-wave and infra-red data communications.

Computing device 1500 also includes data communications network interface 1518 coupled to bus 1502. Network interface 1518 may provide a two-way data communication coupling to a wired or wireless network link 1520 that is connected to a local, cellular or mobile network 1522. For example, network interface 1518 may be IEEE 802.3 wired "ethernet" card, an IEEE 802.11 wireless local area network (WLAN) card, an IEEE 802.15 wireless personal area network (e.g., Bluetooth) card or a cellular network (e.g., GSM, LTE, etc.) card to provide a data communication connection to a compatible wired or wireless network. Network interface 1518 may send and receive electrical, electromagnetic or optical signals that carry digital data streams representing various types of information.

Network link 1520 provides data communication through one or more networks to other data devices. For example, network link 1520 may provide a persistent, periodic, or intermittent connection through network 1522 to local computing device 1524 that is also connected to network 1522 or to data communication equipment operated by a network access provider 1526 such as, for example, an internet service provider or a cellular network provider. Network access provider 1526 in turn may provide data communication connectivity to another data communications network 1528 (e.g., the Internet). Networks 1522 and 1528 both may use electrical, electromagnetic or optical signals that carry digital data streams. The signals through the various networks and the signals on network link 1520 and through network interface 1518, which carry the digital data to and from computing device 1500, are example forms of transmission media. Computing device 1500 may send messages and receives data, including program code, through the networks 1522 and 1528, network link 1520 and network interface 1518. In the Internet example, a remote computing device 1530 may transmit a requested code for an application program through network 1528, network 1522 and network interface 1518. The received code may be executed by processor 1504 as it is received, or stored in storage device 1510, or other non-volatile storage for later execution.

CONCLUSION

Unless the context clearly indicates otherwise, the term "or" is used in the foregoing specification and in the appended claims in its inclusive sense (and not in its exclusive sense) so that when used, for example, to connect a list of elements, the term "or" means one, some, or all of the elements in the list.

Unless the context clearly indicates otherwise, the terms "comprising," "including," "having," "based on," "encompassing," and the like are used in the foregoing specification and in the appended claims in an open-ended fashion, and do not exclude additional elements, features, acts, or operations.

Unless the context clearly indicates otherwise, conjunctive language such as the phrase "at least one of X, Y and Z," is to be understood to convey that an item, term, etc. may be either X, Y or Z, or a combination thereof. Thus, such conjunctive language is not intended to imply that certain embodiments require at least one of X, at least one of Y and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method comprising:
    receiving, from a first client device, a request to create a reusable component at a first location in a first collaborative content item, the request indicating a severable one-way tether;
    storing the reusable component in a reusable component catalog of a collaborative content management system;
    receiving, from a second client device, a request to insert the reusable component at a second location in a second collaborative content item;
    retrieving the reusable component from the reusable component catalog and sending a copy of the reusable component to the second client device, the severable one-way tether linking the reusable component and the copy, the linking causing edits to the reusable component to be reflected in the copy, the severable one-way tether indicating that the linking is to be severed responsive to the copy being edited at the second location;
    causing a first edit to the reusable component at the first location in the first collaborative content item to be reflected in the copy of the reusable component at the second location in the second collaborative content item based on the severable one-way tether;
    receiving a second edit to the copy of the reusable component at the second location in the second collaborative content item; and
    responsive to receiving the second edit, severing the severable one-way tether such that further edits to the reusable component at the first location are not reflected in the second location in the second collaborative content item, wherein the copy of the reusable component is displayed differently at the second location than it is displayed in the first location based on the second location having a different context from the first location.

2. The computer-implemented method of claim 1, further comprising:
retrieving the first edit to the reusable component at the first location in the first collaborative content item from the reusable component catalog and sending the first edit to the second client device.

3. The computer-implemented method of claim 1, wherein the reusable component is text, an image, or a data table.

4. The computer-implemented method of claim 1, further comprising:
replicating a first set of edits to the reusable component at the first location in the first collaborative content item to the copy of the reusable component at the second location in the second collaborative content item.

5. A computing system comprising:
one or more processors;
storage media;
instructions stored in the storage media which, when executed by the computing system, causes the computing system to perform:
receiving, from a first client device, a request to create a reusable component at a first location in a first collaborative content item, the request indicating a severable one-way tether;
storing the reusable component in a reusable component catalog of a collaborative content management system;
receiving, from a second client device, a request to insert the reusable component at a second location in a second collaborative content item;
retrieving the reusable component from the reusable component catalog and sending a copy of the reusable component to the second client device, the severable one-way tether linking the reusable component and the copy, the linking causing edits to the reusable component to be reflected in the copy, the severable one-way tether indicating that the linking is to be severed responsive to the copy being edited at the second location;
receiving, from the first client device, a first edit to the reusable component at the first location in the first collaborative content item; and
sending the first edit to the second client device thereby causing the copy of the reusable component at the second location in the second collaborative content item to be updated to reflect the first edit based on the severable one-way tether;
receiving a second edit to the copy of the reusable component at the second location in the second collaborative content item; and
responsive to receiving the second edit, severing the severable one-way tether such that further edits to the reusable component at the first location are not reflected in the second location in the second collaborative content item, wherein the copy of the reusable component is displayed differently at the second location than it is displayed in the first location based on the second location having a different context from the first location.

6. The computing system of claim 5, wherein the sending the first edit to the second client device is based on retrieving the first edit to the reusable component at the first location in the first collaborative content item from the reusable component catalog.

7. The computing system of claim 5, wherein the reusable component is text, an image, or a data table.

8. The computing system of claim 5, further comprising instructions which, when executed by the computing system, cause the computing system to perform:
replicating a first set of edits to the reusable component at the first location in the first collaborative content item to the copy of the reusable component at the second location in the second collaborative content item.

9. A method comprising:
obtaining, at a client device, a request to insert a reusable component at a particular location in a first collaborative content item displayed at the client device;
displaying, at the client device, graphical user interface controls for selecting a reusable component of a set of reusable components;
receiving, at the client device via the graphical user interface controls, a selection of a particular reusable component of the set of reusable components, the particular reusable component associated with a severable one-way tether;
inserting, at the client device, a copy of the particular reusable component at the particular location in the first collaborative content item, the severable one-way tether linking the reusable component and the copy, the linking causing edits to the reusable component to be reflected in the copy, the severable one-way tether indicating that the linking is to be severed responsive to the copy being edited at the second location;
receiving, at the client device, an indication from a server that a first edit was made to the particular reusable component in a second collaborative content item;
displaying, at the client device, the copy of the particular reusable component at the particular location in the first collaborative content item, the displaying reflecting the first edit as made to the copy of the particular reusable component in the second collaborative content item based on the severable one-way tether;
receiving a second edit to the copy of the particular reusable component at the second location in the second collaborative content item; and
responsive to receiving the second edit, severing the severable one-way tether such that further edits to the particular reusable component at the first location are not reflected in the second location in the second collaborative content item, wherein the copy of the reusable component is displayed differently at the second location than it is displayed in the first location based on the second location having a different context from the first location.

10. The method of claim 9, further comprising:
receiving, at the client device, a second edit to the copy of the particular reusable component at the particular location in the first collaborative content item; and
sending, from the client device to a server, an indication of the second edit.

11. The method of claim 9, wherein the particular location is inline with content of the first collaborative content item.

12. The method of claim 9, wherein the obtaining the request to insert the reusable component at the particular location in the first collaborative content item is based on:
detecting user input of an inline reusable component selection expression at the particular location in the first collaborative content item.

13. The method of claim 12, further comprising:
displaying, at the client device, the graphical user interface controls for selecting a reusable component of the set of reusable components based on the detecting the user input of the inline reusable component selection expression.

14. The method of claim 9, further comprising:
visually indicating, at the client device, that the particular reusable component at the particular location in the first collaborative content item is a reusable component.

15. The method of claim 9, further comprising:
visually indicating, at the client device, that the particular reusable component at the particular location in the first collaborative content item is read-only.

16. The method of claim 9, further comprising:
displaying, at the client device, graphical user interface controls for selecting one of a plurality of different ways in which to render the particular reusable component at the particular location in the first collaborative content item;
receiving, at the client device via the graphical user interface controls for selecting one of the plurality of different ways in which to render the particular reusable component, a particular way in which to render the particular reusable component; and
rendering, at the client device, the particular reusable component at the particular location in the first collaborative content item in the particular way.

17. The method of claim 16, wherein the plurality of different ways in which to render the particular reusable component includes at least: as text and as a graphic.

18. The method of claim 9, further comprising:
detecting, at the client device, a particular context of the particular location in the first collaborative content item;
based on the particular context, automatically selecting a particular way of a plurality of different ways in which to render the particular reusable component at the particular location in the first collaborative content item; and
rendering, at the client device, the particular reusable component at the particular location in the first collaborative content item differently in the particular way.

* * * * *